United States Patent
Ideta et al.

(10) Patent No.: US 12,528,915 B2
(45) Date of Patent: *Jan. 20, 2026

(54) POLYCARBONATE RESIN COMPOSITION

(71) Applicant: IDEMITSU KOSAN CO., LTD., Tokyo (JP)

(72) Inventors: Kazushige Ideta, Chiba (JP); Yasuhiro Ishikawa, Ichihara (JP); Hirotoshi Ishii, Kisarazu (JP)

(73) Assignee: IDEMITSU KOSAN CO.,LTD., Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 17/622,220

(22) PCT Filed: Jun. 30, 2020

(86) PCT No.: PCT/JP2020/025620
§ 371 (c)(1),
(2) Date: Dec. 22, 2021

(87) PCT Pub. No.: WO2021/002346
PCT Pub. Date: Jan. 7, 2021

(65) Prior Publication Data
US 2022/0363839 A1 Nov. 17, 2022

(30) Foreign Application Priority Data
Jul. 3, 2019 (JP) .................. 2019-124852

(51) Int. Cl.
| C08G 77/448 | (2006.01) |
| C08K 5/08 | (2006.01) |
| C08K 5/103 | (2006.01) |
| C08K 5/12 | (2006.01) |
| C08K 5/13 | (2006.01) |
| C08K 5/3475 | (2006.01) |
| C08K 5/3492 | (2006.01) |
| C08K 5/357 | (2006.01) |
| C08K 5/42 | (2006.01) |
| C08K 5/524 | (2006.01) |
| C08K 5/5415 | (2006.01) |
| C08L 83/10 | (2006.01) |

(52) U.S. Cl.
CPC .............. *C08G 77/448* (2013.01); *C08K 5/08* (2013.01); *C08K 5/103* (2013.01); *C08K 5/12* (2013.01); *C08K 5/13* (2013.01); *C08K 5/3475* (2013.01); *C08K 5/3492* (2013.01); *C08K 5/357* (2013.01); *C08K 5/42* (2013.01); *C08K 5/524* (2013.01); *C08K 5/5415* (2013.01); *C08L 83/10* (2013.01)

(58) Field of Classification Search
CPC ...... C08G 77/448; C08K 5/08; C08K 5/3492; C08K 5/524; C08K 5/103; C08K 5/12; C08K 5/13; C08K 5/3475; C08K 5/357; C08K 5/42; C08K 5/5415; C08L 83/10
See application file for complete search history.

(56) References Cited

U.S. PATENT DOCUMENTS

| 6,340,737 B2 * | 1/2002 | Ogawa ................ C08G 77/448 528/196 |
| 8,492,485 B2 | 7/2013 | Ishikawa et al. |
| 2012/0108739 A1 * | 5/2012 | Ishikawa ................ C08K 5/005 524/588 |
| 2012/0283393 A1 | 11/2012 | Ishikawa |
| 2012/0288654 A1 * | 11/2012 | Gallucci ............. C08G 64/186 524/588 |
| 2018/0251636 A1 | 9/2018 | Abe et al. |
| 2018/0355113 A1 | 12/2018 | Takimoto et al. |
| 2019/0345335 A1 * | 11/2019 | Long .................... C08G 77/448 |
| 2020/0317846 A1 | 10/2020 | Ideta et al. |

FOREIGN PATENT DOCUMENTS

| CN | 102119191 A | 7/2011 |
| CN | 111527127 A | 8/2020 |
| JP | H08-311206 A | 11/1996 |
| JP | 2003-277574 A | 10/2003 |
| JP | 2010-037495 A | 2/2010 |
| JP | 2011-122048 A | 6/2011 |
| KR | 10-2011-0033259 A | 3/2011 |
| KR | 10-2018-0097571 A | 8/2018 |
| TW | 201725239 A | 7/2017 |
| WO | WO-2017/034040 A1 | 3/2017 |
| WO | WO-2017/110754 A1 | 6/2017 |
| WO | WO-2019/004200 A1 | 1/2019 |

OTHER PUBLICATIONS

International Searching Authority, "International Search Report," issued in connection with International Patent Application No. PCT/JP2020/025620, dated Sep. 15, 2020.
International Searching Authority, "Written Opinion," issued in connection with International Patent Application No. PCT/JP2020/025620, dated Sep. 15, 2020.
European Extended Search Report issued in corresponding European Patent Application No. 20834959.7 dated Jun. 28, 2023 (7 pages).

(Continued)

*Primary Examiner* — John E Uselding
(74) *Attorney, Agent, or Firm* — Foley & Lardner LLP

(57) ABSTRACT

Provided is a polycarbonate-based resin composition including: a polycarbonate-polyorganosiloxane copolymer (A); and at least one kind of compound (B) selected from the group consisting of an antioxidant, a dye, a release agent, a light-diffusing agent, a flame retardant, a UV absorber, a silicone-based compound, an epoxy compound, and a polyether compound, wherein the polycarbonate-polyorganosiloxane copolymer (A) contains a polycarbonate block (A-1) and a polyorganosiloxane block (A-2), and satisfies the following requirements (1) to (3): (1) the content of the polyorganosiloxane block (A-2) is from more than 40 mass % to 70 mass % or less; (2) the copolymer has a viscosity-average molecular weight of from 10,000 to 23,000; and (3) the copolymer contains a specific polycarbonate block as the polycarbonate block (A-1).

13 Claims, No Drawings

(56) References Cited

OTHER PUBLICATIONS

Office Action issued in corresponding Chinese Patent Application No. 202080046270.X dated Oct. 14, 2023 (19 pages).
Office Action issued in corresponding Taiwanese Patent Application No. 109122582 dated Mar. 8, 2024 (14 pages).
Office Action issued in corresponding Indian Patent Application No. 202147060574 dated Jan. 12, 2024.
Office Action issued in corresponding Japanese Patent Application No. 2021-530029 dated Apr. 2, 2024 (8 pages).
Office Action issued in corresponding Chinese Patent Application No. 202080046270.X dated Jun. 26, 2024 (12 pages).
Office Action issued in corresponding Indian Patent Application No. 202147060574 dated Nov. 5, 2024.
Office Action issued in corresponding Chinese Patent Application No. 202080046270.X dated Sep. 13, 2024 (10 pages).
Office Action issued in corresponding Korean Patent Application No. 10-2021-7042608 dated Aug. 14, 2025.

\* cited by examiner

POLYCARBONATE RESIN COMPOSITION

CROSS-REFERENCE TO RELATED APPLICATIONS

The present application claims priority under 37 U.S.C. § 371 to International Patent Application No. PCT/JP2020/025620, filed Jun. 30, 2020, which claims priority to and the benefit of Japanese Patent Application No. 2019-124852, filed on Jul. 3, 2019. The contents of these applications are hereby incorporated by reference in their entireties.

TECHNICAL FIELD

The present invention relates to a polycarbonate-based resin composition, and more specifically, to a polycarbonate-based resin composition including a polycarbonate-polyorganosiloxane copolymer that has flexibility and is excellent in transparency.

BACKGROUND ART

A resin molded article having flexibility, which can be bonded to various shapes or can be used by being deformed or processed in accordance with various designs, has been required as a lighting cover or optical lens for a street light or the like. In such application, transparency and mechanical characteristics are required in addition to the flexibility.

An acrylic resin has been widely investigated as such resin because of its high transparency and optical characteristics (Patent Document 1). The acrylic resin has a drawback in that the resin is poor in mechanical strength, molding processability, and handleability, though the resin is excellent in transparency and flexibility.

CITATION LIST

Patent Document

Patent Document 1: JP 2003-277574 A

SUMMARY OF INVENTION

Technical Problem

As compared to the acrylic resin, a polycarbonate-based resin is excellent in mechanical strength and molding processability, but tends to be poor in flexibility.

An object of the present invention is to provide a polycarbonate-based resin composition having both of excellent flexibility and transparency.

Solution to Problem

The inventors of the present invention have found that the incorporation of a polycarbonate-polyorganosiloxane copolymer (hereinafter sometimes abbreviated as "PC-POS copolymer") having a specific structural unit and satisfying a specific condition can provide a polycarbonate-based resin composition having flexibility and having excellent transparency and mechanical strength of the polycarbonate-polyorganosiloxane copolymer.

That is, the present invention relates to the following items [1] to [15].

[1] A polycarbonate-based resin composition, comprising:
a polycarbonate-polyorganosiloxane copolymer (A); and
at least one kind of compound (B) selected from the group consisting of an antioxidant, a dye, a release agent, a light-diffusing agent, a flame retardant, a UV absorber, a silicone-based compound, an epoxy compound, and a polyether compound,
wherein the polycarbonate-polyorganosiloxane copolymer (A) contains a polycarbonate block (A-1) comprising a repeating unit represented by the following general formula (I) and a polyorganosiloxane block (A-2) containing a repeating unit represented by the following general formula (II), and satisfies the following requirements (1) to (3):
(1) a content of the polyorganosiloxane block (A-2) is from more than 40 mass % to 70 mass % or less;
(2) the copolymer has a viscosity-average molecular weight of from 10,000 or more to 23,000 or less; and
(3) the copolymer contains, as the polycarbonate block (A-1), such a polycarbonate block that in the following general formula (I), "a" and "b" each represent 0, and X represents an isopropylidene group:

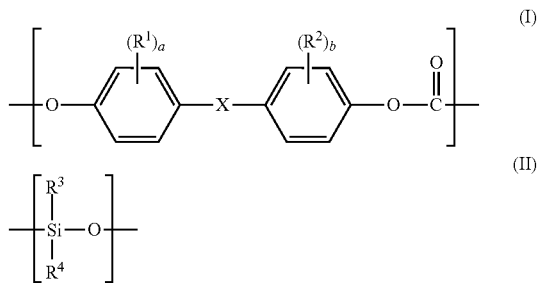

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[2] A polycarbonate-based resin composition, comprising:
a polycarbonate-polyorganosiloxane copolymer (A); and
at least one kind of compound (B) selected from the group consisting of an antioxidant, a dye, a release agent, a light-diffusing agent, a flame retardant, a UV absorber, a silicone-based compound, an epoxy compound, and a polyether compound,
wherein the polycarbonate-polyorganosiloxane copolymer (A) contains a polycarbonate block (A-1) comprising a repeating unit represented by the following general formula (I) and a polyorganosiloxane block (A-2) containing a repeating unit represented by the following general formula (II), and wherein the following requirements (1) to (3) are satisfied:
(1) a content of the polyorganosiloxane block (A-2) in the polycarbonate-based resin composition is from 25 mass % or more to 70 mass % or less;

(2) the polycarbonate-polyorganosiloxane copolymer (A) has a viscosity-average molecular weight of from 10,000 or more to 23,000 or less; and
(3) the copolymer contains, as the polycarbonate block (A-1), such a polycarbonate block that in the following general formula (I), "a" and "b" each represent 0, and X represents an isopropylidene group:

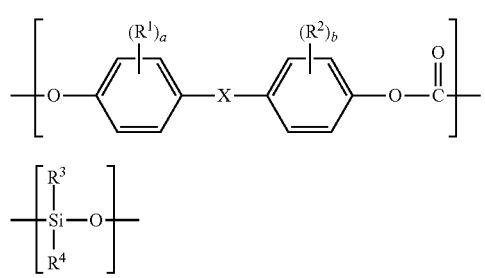

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

[3] The polycarbonate-based resin composition according to Item [1] or [2], wherein the polycarbonate-based resin composition comprises 0.001 part by mass to 0.5 part by mass of the antioxidant, 0.00001 part by mass to 0.05 part by mass of the dye, 0.001 part by mass to 0.5 part by mass of the release agent, 0.1 part by mass to 5 parts by mass of the light-diffusing agent, 0.001 part by mass to 20 parts by mass of the flame retardant, 0.01 part by mass to 1 part by mass of the UV absorber, 0.01 part by mass to 0.25 part by mass of the silicone-based compound, 0 parts by mass to 0.2 part by mass of the epoxy compound, and/or 0.2 part by mass to 1 part by mass of the polyether compound with respect to 100 parts by mass of the polycarbonate-polyorganosiloxane copolymer (A).

[4] The polycarbonate-based resin composition according to any one of Items [1] to [3], wherein a content of a unit represented by the following general formula (III) in the polyorganosiloxane block (A-2) is 0.1 mol % or less:

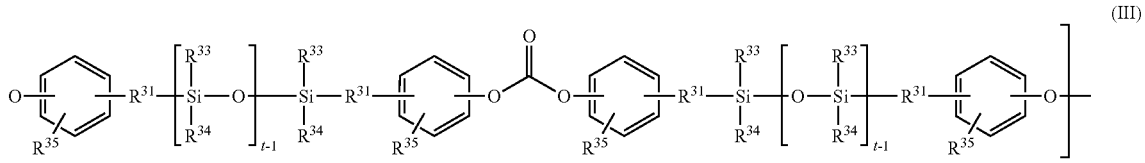

wherein $R^{33}$ and $R^{34}$ each independently represent a hydrogen atom, a halogen atom, an alkyl group having 1 to 6 carbon atoms, an alkoxy group having 1 to 6 carbon atoms, or an aryl group having 6 to 12 carbon atoms, $R^{31}$ represents an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an arylene group having 6 to 12 carbon atoms, a fluorenediyl group, an arylalkylene group having 7 to 15 carbon atoms, or an arylalkylidene group having 7 to 15 carbon atoms, $R^{35}$ represents a hydrogen atom, a halogen atom, an alkyl group having 1 to 6 carbon atoms, an alkoxy group having 1 to 6 carbon atoms, or an aryl group having 6 to 12 carbon atoms, and "t" represents an average chain length of the polyorganosiloxane.

[5] The polycarbonate-based resin composition according to any one of Items [1] to [4], wherein the polyorganosiloxane block (A-2) has a number of repetitions of from 10 or more to less than 90.

[6] The polycarbonate-based resin composition according to Item [5], wherein the polyorganosiloxane block (A-2) has a number of repetitions of from or more to 40 or less.

[7] The polycarbonate-based resin composition according to any one of Items [1] to [6], wherein the polycarbonate-polyorganosiloxane copolymer (A) has a molecular weight distribution Mw/Mn of from 2.1 or more to 3.9 or less.

[8] The polycarbonate-based resin composition according to any one of Items [1] to [7], wherein the polycarbonate-polyorganosiloxane copolymer (A) has a weight-average molecular weight of 40,000 or less.

[9] The polycarbonate-based resin composition according to any one of Items [1] to [8], wherein the polyorganosiloxane block (A-2) contains a unit represented by at least one of the following general formulae (II-I) to (II-III):

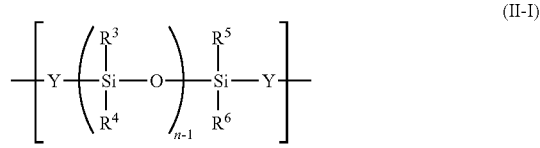

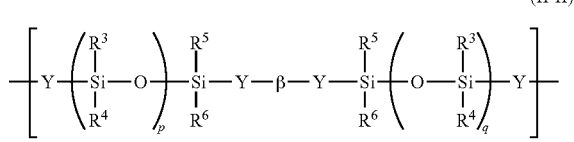

-continued

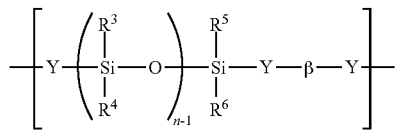
(II-III)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents a chain length of the polyorganosiloxane, n-1, and "p" and "q" each represent an integer of 1 or more representing the number of repetitions of a polyorganosiloxane unit, and a sum of "p" and "q" is n-2.

[10] The polycarbonate-based resin composition according to any one of Items [1] to [9], wherein the polyorganosiloxane block (A-2) contains a unit represented by the following general formula (V):

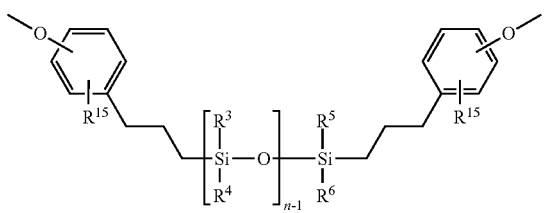
(V)

wherein $R^3$ to $R^6$ and n-1 are identical to those described in the general formulae (II-I) to (II-III), and $R^{15}$ represents a hydrogen atom, a halogen atom, an alkyl group having 1 to 6 carbon atoms, an alkoxy group having 1 to 6 carbon atoms, or an aryl group having 6 to 12 carbon atoms.

[11] The polycarbonate-based resin composition according to any one of Items [1] to [10], wherein a 2-millimeter thick plate formed of the polycarbonate-based resin composition has a total light transmittance of 75% or more, which is measured in conformity with JIS K 7361-1:1997.

[12] The polycarbonate-based resin composition according to any one of Items [1] to [11], wherein the polycarbonate-based resin composition has a durometer hardness of from 25 or more to 72 or less, which is measured with a type D durometer in conformity with JIS K 6253-3:2012.

[13] The polycarbonate-based resin composition according to any one of Items [1] to [11], wherein the polycarbonate-based resin composition has a durometer hardness of from 25 or more to 60 or less, which is measured with a type D durometer in conformity with JIS K 6253-3:2012.

[14] The polycarbonate-based resin composition according to any one of Items [1] to [13], wherein the content of the polyorganosiloxane block (A-2) in the resin composition is from more than 40 mass % to 70 mass % or less.

[15] The polycarbonate-based resin composition according to any one of Items [1] to [14], wherein the polycarbonate-based resin composition is free of a polycarbonate-based resin except the polycarbonate-polyorganosiloxane copolymer (A).

Advantageous Effects of Invention

According to the present invention, the polycarbonate-based resin composition having both of excellent flexibility and transparency can be provided.

DESCRIPTION OF EMBODIMENTS

Detailed description of a polycarbonate-based resin composition of the present invention is given below. In this description, a specification considered to be preferred may be arbitrarily adopted, and it may be said that a combination of preferred specifications is more preferred. The term "XX to YY" as used herein means "from XX or more to YY or less."

A polycarbonate-based resin composition according to one aspect of the present invention comprises: a polycarbonate-polyorganosiloxane copolymer (A); and at least one kind of compound (B) selected from the group consisting of an antioxidant, a dye, a release agent, a light-diffusing agent, a flame retardant, a UV absorber, a silicone-based compound, an epoxy compound, and a polyether compound, wherein the polycarbonate-polyorganosiloxane copolymer (A) contains a polycarbonate block (A-1) comprising a repeating unit represented by the following general formula (I) and a polyorganosiloxane block (A-2) containing a repeating unit represented by the following general formula (II), and satisfies the following requirements (1) to (3):

(1) a content of the polyorganosiloxane block (A-2) is from more than 40 mass % to 70 mass % or less;
(2) the copolymer has a viscosity-average molecular weight of from 10,000 or more to 23,000 or less; and
(3) the copolymer contains, as the polycarbonate block (A-1), such a polycarbonate block that in the general formula (I), "a" and "b" each represent 0, and X represents an isopropylidene group:

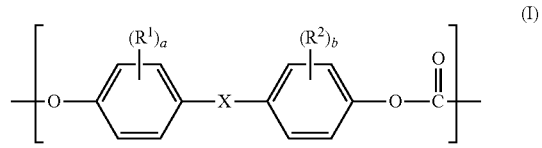
(I)

(II)

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to carbon atoms, an arylene group having 6 to 12 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4.

A polycarbonate-based resin composition according to another aspect of the present invention comprises: a polycarbonate-polyorganosiloxane copolymer (A); and at least one kind of compound (B) selected from the group consisting of an antioxidant, a dye, a release agent, a light-diffusing agent, a flame retardant, a UV absorber, a silicone-based compound, an epoxy compound, and a polyether compound, wherein the polycarbonate-polyorganosiloxane copolymer (A) contains a polycarbonate block (A-1) comprising a repeating unit represented by the general formula (I) and a polyorganosiloxane block (A-2) containing a repeating unit represented by the general formula (II), and wherein the following requirements (1) to (3) are satisfied:

(1) a content of the polyorganosiloxane block (A-2) in the polycarbonate-based resin composition is from 25 mass % or more to 70 mass % or less;

(2) the polycarbonate-polyorganosiloxane copolymer (A) has a viscosity-average molecular weight of from 10,000 or more to 23,000 or less; and (3) the copolymer contains, as the polycarbonate block (A-1), such a polycarbonate block that in the following general formula (I), "a" and "b" each represent 0, and X represents an isopropylidene group.

The polycarbonate block (A-1) represented by the general formula (I) is described in detail. In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and the same holds true for the following), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the arylene group represented by X include a phenylene group, a naphthylene group, and a biphenylene group. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group. Examples of the aryl moiety of the arylalkylidene group represented by X include aryl groups each having 6 to 14 ring-forming carbon atoms, such as a phenyl group, a naphthyl group, a biphenyl group, and an anthryl group.

"a" and "b" each independently represent an integer of from 0 to 4, preferably from 0 to 2, more preferably 0 or 1. Among them, a repeating unit in which "a" and "b" each represent 0, and X represents a single bond or an alkylene group having 1 to 8 carbon atoms, or a repeating unit in which "a" and "b" each represent 0, and X represents an alkylidene group, in particular an isopropylidene group is suitable.

The PC-POS copolymer (A) in the polycarbonate-based resin composition of the present invention satisfies the following requirement (3): the copolymer contains, as the polycarbonate block (A-1), such a polycarbonate block (hereinafter sometimes abbreviated as "BPA block") that in the general formula (I), "a" and "b" each represent 0, and X represents an isopropylidene group. The amount of the BPA block in the polycarbonate block (A-1) is preferably 90 mass % or more, more preferably 90.9 mass % or more, still more preferably 93.3 mass % or more, particularly preferably 95 mass % or more, most preferably 100 mass %. The amount of the BPA block preferably falls within the ranges from the viewpoint of the transparency of the composition.

A plurality of kinds of polycarbonate blocks may be incorporated as the polycarbonate blocks (A-1) of the PC-POS copolymer (A) as long as the above-mentioned requirement (3) is satisfied. When the polycarbonate blocks (A-1) include a plurality of kinds of blocks, the total amount of the BPA block and the other polycarbonate block becomes 100 mass %.

Next, the polyorganosiloxane block (A-2) represented by the general formula (II) is described in detail.

In the general formula (II), examples of the halogen atom that $R^3$ and $R^4$ each independently represent include a fluorine atom, a chlorine atom, a bromine atom, and an iodine atom. Examples of the alkyl group that $R^3$ and $R^4$ each independently represent include a methyl group, an ethyl group, a n-propyl group, an isopropyl group, various butyl groups, various pentyl groups, and various hexyl groups. Examples of the alkoxy group that $R^3$ and $R^4$ each independently represent include alkoxy groups having the above-mentioned alkyl groups as alkyl group moieties. Examples of the aryl group that $R^3$ and $R^4$ each independently represent include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

The polyorganosiloxane block (A-2) containing the repeating unit represented by the general formula (II) preferably has a unit represented by any one of the following general formulae (II-I) to (II-III):

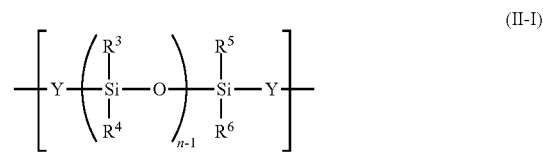

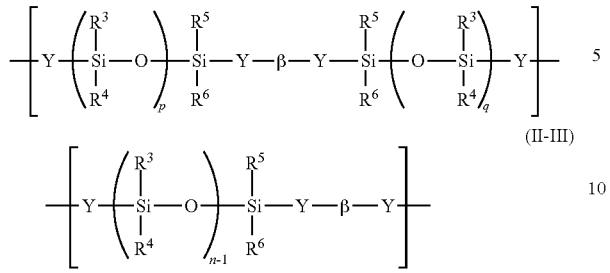

(II-II)

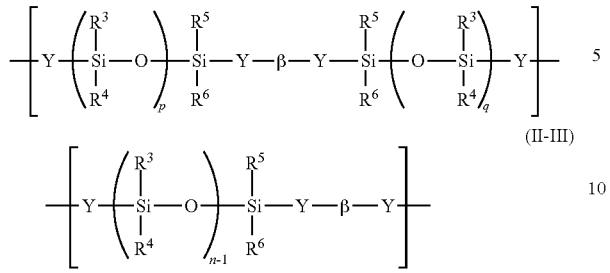

(II-III)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents the chain length of the polyorganosiloxane, n-1, and "p" and "q" each represent an integer of 1 or more representing the number of repetitions of a polyorganosiloxane unit, and the sum of "p" and "q" is n-2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. Examples of the alkoxy group that $R^3$ to $R^6$ each independently represent include alkoxy groups having the above-mentioned alkyl groups as alkyl group moieties. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

$R^3$ to $R^6$ in the general formula (II-I), the general formula (II-II), and/or the general formula (II-III) each preferably represent a methyl group.

The linear or branched alkylene group represented by $R^7$ in —$R^7$O—, —$R^7$COO—, —$R^7$NH—, —$R^7$NR$^8$—, —$R^7$COO—$R^9$—O—, or —$R^7$O—$R^{10}$—O— represented by Y is, for example, an alkylene group having 1 to 8 carbon atoms, preferably 1 to 5 carbon atoms. The cyclic alkylene group is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (i) or (ii). When the aryl-substituted alkylene group is present, the alkylene group is bonded to Si.

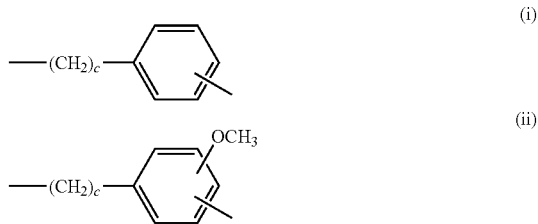

wherein "c" represents a positive integer and typically represents an integer of from 1 to 6.

The diarylene group represented by any one of $R^7$, $R^9$, and $R^{10}$ refers to a group in which two arylene groups are linked to each other directly or through a divalent organic group, and is specifically a group having a structure represented by —$Ar^1$—W—$Ar^2$—. $Ar^1$ and $Ar^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group is, for example, a linear or branched group having 2 to 8, preferably 2 to 5 carbon atoms. The aryl group is, for example, a phenyl group or a naphthyl group. The aralkyl group is, for example, a phenylmethyl group or a phenylethyl group.

The linear, branched, or cyclic alkylene group represented by $R^{10}$ is the same as that represented by $R^7$.

Y preferably represents —$R^7$O—. $R^7$ preferably represents an aryl-substituted alkylene group, in particular a residue of a phenol-based compound having an alkyl group, and more preferably represents an organic residue derived from allylphenol or an organic residue derived from eugenol.

With regard to "p" and "q" in the formula (II-II), it is preferred that p=q.

β represents a divalent group derived from a diisocyanate compound, or a divalent group derived from a dicarboxylic acid or a halide of a dicarboxylic acid, and examples thereof include divalent groups represented by the following general formulae (iii) to (vii).

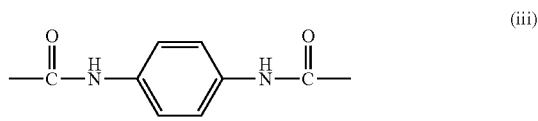

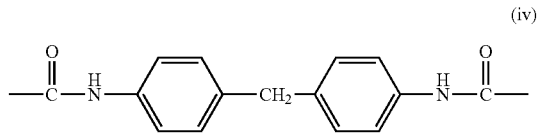

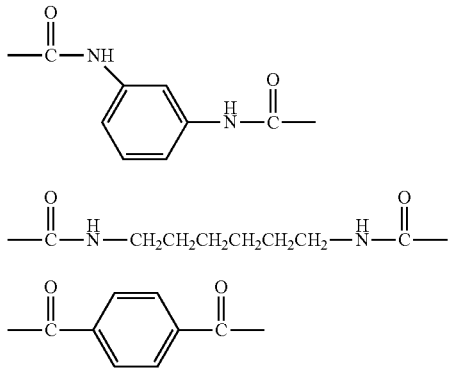

(v)

(vi)

(vii)

In the PC-POS copolymer (A), it is more preferred that the polyorganosiloxane block (A-2) contain a unit represented by the following general formula (V):

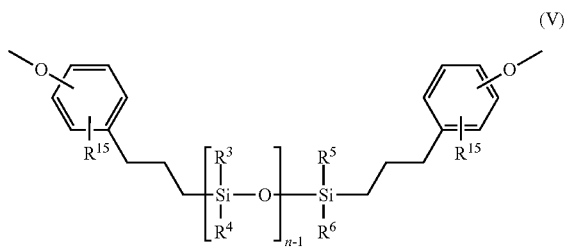

(V)

wherein $R^3$ to $R^6$ and "n" are identical to those described in the general formulae (II-I) to (II-III), and $R^{15}$ represents a hydrogen atom, a halogen atom, an alkyl group having 1 to 6 carbon atoms, an alkoxy group having 1 to 6 carbon atoms, or an aryl group having 6 to 12 carbon atoms.

The number of repetitions of the polyorganosiloxane block (A-2) in the PC-POS copolymer (A) is preferably from 10 or more to less than 90, more preferably from 10 or more to 40 or less. Specifically, the number of repetitions is preferably 10 or more, more preferably 15 or more, still more preferably 20 or more, and is preferably less than 90, more preferably 80 or less, still more preferably 60 or less, still more preferably 45 or less, still more preferably 40 or less, particularly preferably less than 40.

The number of repetitions is calculated by nuclear magnetic resonance (NMR) measurement. When the number of repetitions of the polyorganosiloxane block (A-2) is set within the above-mentioned ranges, both of excellent transparency and flexibility can be achieved, and peeling after the production of a molded body can be suppressed.

In one aspect of the present invention, the PC-POS copolymer (A) in the polycarbonate-based resin composition satisfies the following requirement (1): the content of the polyorganosiloxane block (A-2) is from more than 40 mass % to 70 mass % or less. When the content of the polyorganosiloxane block (A-2) in the PC-POS copolymer (A) is set to more than 40 mass %, a copolymer excellent in flexibility can be obtained. When the content of the polyorganosiloxane block (A-2) is 70 mass % or less, a copolymer that is free of remarkable tackiness and can maintain a shape as a flexible molded body is obtained.

The content of the polyorganosiloxane block (A-2) in the PC-POS copolymer (A) is preferably 41 mass % or more, more preferably 45 mass % or more, for example, more than 50 mass %, and is preferably 65 mass % or less, more preferably 62 mass % or less.

In another aspect of the present invention, the polycarbonate-based resin composition satisfies the following requirement (1): the content of the polyorganosiloxane block (A-2) in the polycarbonate-based resin composition is from 25 mass % or more to 70 mass % or less. When the content of the polyorganosiloxane block (A-2) in the resin composition is set to 25 mass % or more, a resin composition excellent in flexibility and excellent in mechanical strength can be obtained. When the content of the polyorganosiloxane block (A-2) in the resin composition is 70 mass % or less, a flexible molded body free of remarkable tackiness can be obtained.

The content of the polyorganosiloxane block (A-2) in the polycarbonate-based resin composition is preferably 30 mass % or more, more preferably more than 40 mass %, still more preferably 41 mass % or more, still more preferably 45 mass % or more, for example, more than 50 mass %, and is preferably 65 mass % or less, more preferably 62 mass % or less.

The PC-POS copolymer (A) further satisfies the following requirement (2): the copolymer has a viscosity-average molecular weight (Mv) of from 10,000 or more to 23,000 or less. The viscosity-average molecular weight (Mv) may be adjusted by using, for example, a molecular weight modifier (terminal stopper) or by a reaction condition. When the viscosity-average molecular weight is set within the range of the requirement (2), a copolymer excellent in moldability can be obtained.

The viscosity-average molecular weight (Mv) is preferably 12,000 or more, more preferably 14,000 or more, still more preferably 16,000 or more, and is preferably 21,500 or less, more preferably 20,500 or less, still more preferably 19,500 or less, still more preferably 18,500 or less, particularly preferably 18,000 or less. When the viscosity-average molecular weight is 10,000 or more, a sufficient strength of a molded article can be obtained.

The viscosity-average molecular weight (Mv) is a value calculated from the following Schnell's equation by measuring the limiting viscosity [η] of a methylene chloride solution at 20° C.

$$[\eta]=1.23\times10^{-5}\times M_v^{0.83}$$

The weight-average molecular weight (Mw) of the PC-POS copolymer (A) is preferably 40,000 or less. When the weight-average molecular weight (Mw) falls within the range, a PC-POS copolymer excellent in flexibility can be obtained. The weight-average molecular weight (Mw) of the PC-POS copolymer (A) is more preferably 37,000 or less, still more preferably 35,000 or less, still more preferably 30,000 or less. In addition, the weight-average molecular weight (Mw) is preferably 20,000 or more, more preferably 23,000 or more.

Further, the molecular weight distribution (Mw/Mn) of the PC-POS copolymer (A) is preferably from 2.1 or more to 3.9 or less. The molecular weight distribution Mw/Mn of the PC-POS copolymer (A) preferably falls within the range because nonuniformity due to an irregular flow or phase separation at the time of the molding of the polycarbonate-based resin composition including the PC-POS copolymer (A) is suppressed, and hence a molded body having high transparency and flexibility that is easy to control can be obtained.

The molecular weight distribution Mw/Mn of the PC-POS copolymer (A) is more preferably 2.3 or more, still more preferably 2.4 or more, still more preferably 2.5 or more, still more preferably 2.7 or more, particularly preferably 2.8 or more, and is more preferably 3.5 or less, still more preferably 3.0 or less, particularly preferably 2.9 or less.

The PC-POS copolymer (A) may be produced by a known production method, such as an interfacial polymerization method (phosgene method), a pyridine method, or an ester exchange method. In particular, an interfacial polymerization method including adding a polyorganosiloxane to a reaction system in which a dihydric phenol and a carbonate precursor are polymerized to perform copolymerization is preferably adopted because an organic phase containing the PC-POS copolymer and an aqueous phase containing, for example, an unreacted product or a catalyst residue can be separated from each other in an oil-water separation step after the polymerization, and each washing step based on alkali washing, acid washing, or pure water (ion-exchanged water) washing, and hence the PC-POS copolymer is efficiently obtained. With regard to a method of producing the PC-POS copolymer, reference may be made to, for example, a method described in JP 2014-80462 A.

Specifically, the PC-POS copolymer (A) may be produced by: dissolving a polycarbonate oligomer produced in advance to be described later and a polyorganosiloxane in a water-insoluble organic solvent (e.g., methylene chloride); adding a solution of a dihydric phenol-based compound (e.g., bisphenol A) in an aqueous alkaline compound (e.g., aqueous sodium hydroxide) to the solution; and subjecting the mixture to an interfacial polycondensation reaction through the use of a tertiary amine (e.g., triethylamine) or a quaternary ammonium salt (e.g., trimethylbenzylammonium chloride) as a polymerization catalyst in the presence of a terminal stopper (a monohydric phenol, such as p-tert-butylphenol). The PC-POS copolymer (A) may also be produced by copolymerizing the polyorganosiloxane and a dihydric phenol, and phosgene, a carbonate ester, or a chloroformate.

When the PC-POS copolymer (A) in the polycarbonate-based resin composition of the present invention is produced by, for example, causing a polycarbonate oligomer and a polyorganosiloxane raw material to react with each other in an organic solvent, and then causing the resultant to react with a dihydric phenol, from the viewpoint of the transparency of the PC-POS copolymer (A) to be obtained, the solid content weight (g/L) of the polycarbonate oligomer in 1 L of a mixed solution of the organic solvent and the polycarbonate oligomer preferably falls within the range of 200 g/L or less. The solid content weight is more preferably 180 g/L or less, still more preferably 170 g/L or less, still more preferably 150 g/L or less, still more preferably 120 g/L or less.

The lower limit of the solid content weight (g/L) of the polycarbonate oligomer in 1 L of the mixed solution of the organic solvent and the polycarbonate oligomer is not particularly limited because as the solid content weight becomes lower, the transparency of the copolymer to be obtained becomes more satisfactory. However, from the viewpoint of efficiently producing the PC-POS copolymer, the solid content weight is preferably 20 g/L or more, more preferably 30 g/L or more, still more preferably 40 g/L or more.

A polyorganosiloxane represented by the following general formula (1), general formula (2), and/or general formula (3) may be used as the polyorganosiloxane serving as a raw material:

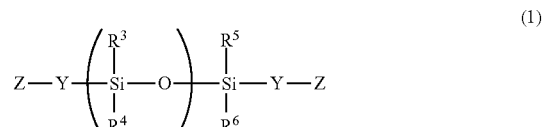

(1)

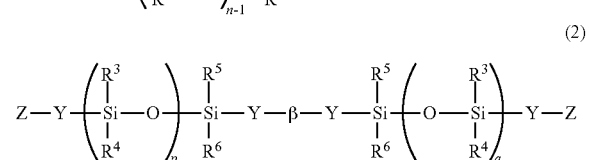

(2)

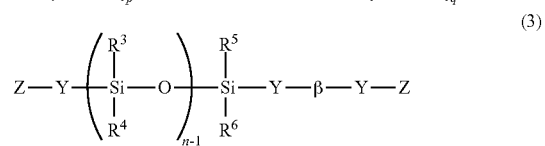

(3)

wherein
$R^3$ to $R^6$, Y, β, n-1, "p", and "q" are as described above, and specific examples and preferred examples thereof are also the same as those described above, and Z represents a hydrogen atom or a halogen atom, and a plurality of Z may be identical to or different from each other.

Examples of the polyorganosiloxane represented by the general formula (1) include compounds each represented by any one of the following general formulae (1-1) to (1-11):

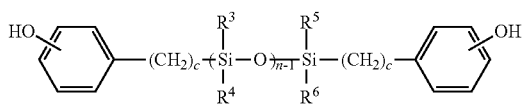

(1-1)

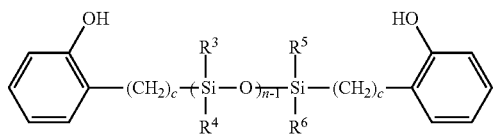

(1-2)

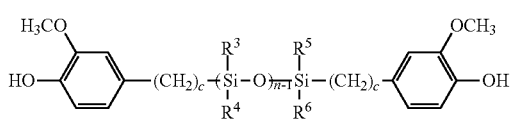

(1-3)

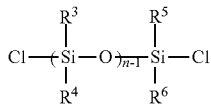

(1-4)

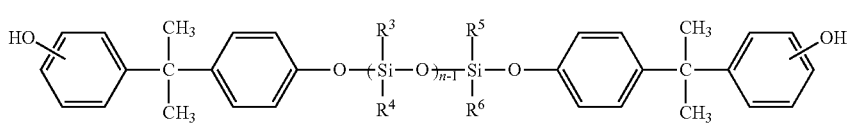

(1-5)

-continued

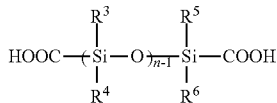 (1-6)

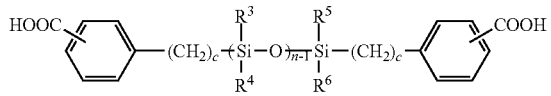 (1-7)

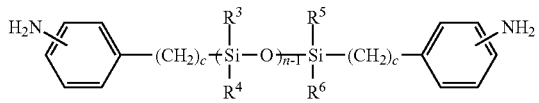 (1-8)

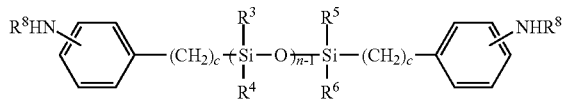 (1-9)

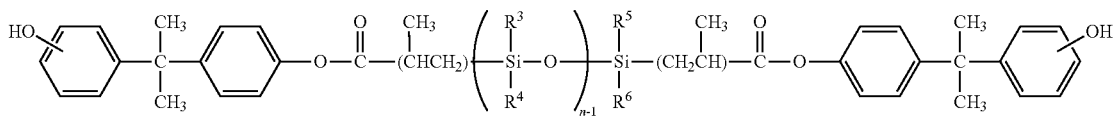 (1-10)

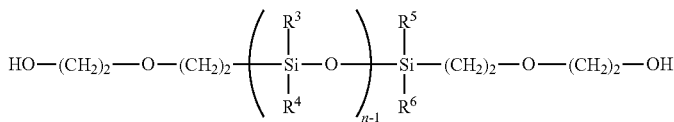 (1-11)

wherein
in the general formulae (1-1) to (1-11), $R^3$ to $R^6$, "n", and $R^8$ are as defined above, and preferred examples thereof are also the same as those described above, and "c" represents a positive integer and typically represents an integer of from 1 to 6.

Among them, a phenol-modified polyorganosiloxane represented by the general formula (1-1) is preferred from the viewpoint of the ease of polymerization for obtaining the polyorganosiloxane. An α,ω-bis[3-(o-hydroxyphenyl)propyl]polydimethylsiloxane, which is one compound represented by the general formula (1-2), or an α,ω-bis[3-(4-hydroxy-3-methoxyphenyl)propyl]polydimethylsiloxane, which is one compound represented by the general formula (1-3), is preferred from the viewpoint of its ease of availability.

In addition to the foregoing, a compound having a structure represented by the following general formula (4) may be used as a polyorganosiloxane raw material:

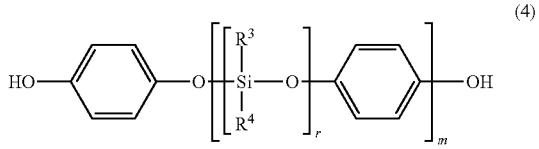 (4)

wherein $R^3$ and $R^4$ are identical to those described above. The average chain length of the polyorganosiloxane block represented by the general formula (4) is (r×m), and the range of the (r×m) is the same as that of the "n".

When the compound represented by the general formula (4) is used as a polyorganosiloxane raw material, the polyorganosiloxane block (A-2) preferably has a unit represented by the following general formula (II-IV):

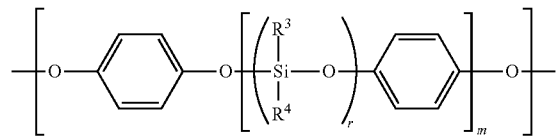 (II-IV)

wherein $R^3$, $R^4$, "r", and "m" are as described above.

The copolymer may include a structure represented by the following general formula (II-V) as the polyorganosiloxane block (A-2):

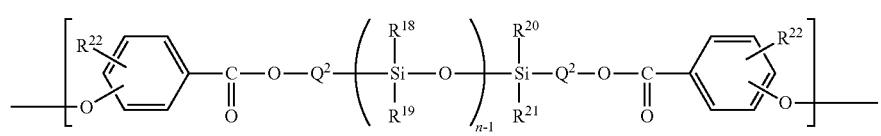 (II-V)

wherein $R^{18}$ to $R^{21}$ each independently represent a hydrogen atom or an alkyl group having 1 to 13 carbon atoms, $R^{22}$ represents an alkyl group having 1 to 6 carbon atoms, a hydrogen atom, a halogen atom, a hydroxy group, an alkoxy group having 1 to 6 carbon atoms, or an aryl group having 6 to 14 carbon atoms, $Q^2$ represents a divalent aliphatic group having 1 to 10 carbon atoms, and n-1 represents the number of repetitions of the polyorganosiloxane block and its range is as described above.

In the general formula (II-V), examples of the alkyl group having 1 to 13 carbon atoms that $R^{18}$ to $R^{21}$ each independently represent include a methyl group, an ethyl group, a n-propyl group, an isopropyl group, various butyl groups, various pentyl groups, various hexyl groups, various heptyl groups, various octyl groups, a 2-ethylhexyl group, various nonyl groups, various decyl groups, various undecyl groups, various dodecyl groups, and various tridecyl groups. Among them, $R^{18}$ to $R^{21}$ each preferably represent a hydrogen atom or an alkyl group having 1 to 6 carbon atoms, and it is more preferred that all of $R^{18}$ to $R^{21}$ each represent a methyl group.

Examples of the alkyl group having 1 to 6 carbon atoms represented by $R^{22}$ include a methyl group, an ethyl group, a n-propyl group, an isopropyl group, various butyl groups, various pentyl groups, and various hexyl groups. Examples of the halogen atom represented by $R^{22}$ include a fluorine atom, a chlorine atom, a bromine atom, and an iodine atom. An example of the alkoxy group having 1 to 6 carbon atoms represented by $R^{22}$ is an alkoxy group whose alkyl group moiety is the alkyl group described above. Examples of the aryl group having 6 to 14 carbon atoms represented by $R^{22}$ include a phenyl group, a tolyl group, a dimethylphenyl group, and a naphthyl group.

$R^{22}$ represents preferably a hydrogen atom or an alkoxy group having 1 to 6 carbon atoms, more preferably a hydrogen atom or an alkoxy group having 1 to 3 carbon atoms, still more preferably a hydrogen atom among them.

The divalent aliphatic group having 1 to 10 carbon atoms represented by $Q^2$ is preferably a linear or branched divalent saturated aliphatic group having 1 to 10 carbon atoms. The number of carbon atoms of the saturated aliphatic group is preferably from 1 to 8, more preferably from 2 to 6, still more preferably from 3 to 6, still more preferably from 4 to 6. The number of repetitions n-1 is as described above.

A preferred mode of the constituent unit (II-V) may be, for example, a structure represented by the following general formula (II-VI):

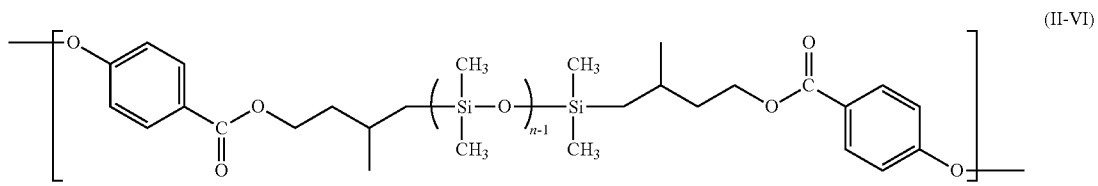

(II-VI)

wherein n-1 is as described above.

The polyorganosiloxane block (A-2) represented by the general formula (II-V) or (II-VI) may be obtained by using a polyorganosiloxane raw material represented by the following general formula (5) or (6):

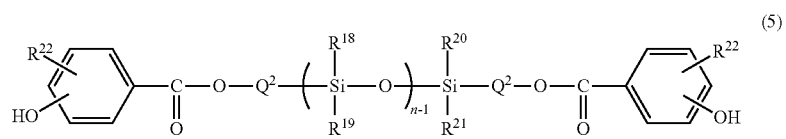

(5)

wherein $R^{18}$ to $R^{22}$, $Q^2$, and n-1 are as described above;

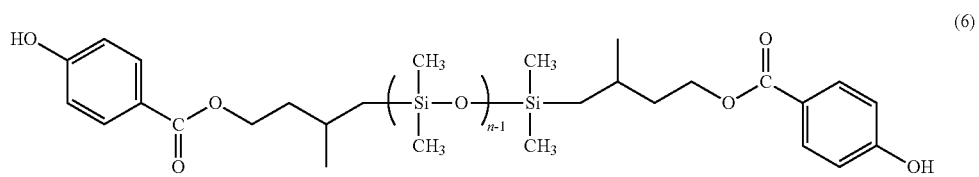

(6)

wherein n-1 is as described above.

A method of producing the polyorganosiloxane is not particularly limited. According to, for example, a method described in JP 11-217390 A, a crude polyorganosiloxane may be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with, for example, a phenolic compound (e.g., 2-allylphenol, 4-allylphenol, eugenol, or 2-propenylphenol) in the presence of a catalyst for a hydrosilylation reaction. According to a method described in JP 2662310 B2, the crude polyorganosiloxane may be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with the phenolic compound or the like in the presence of the catalyst for a hydrosilylation reaction in the same manner as that described above. The α,ω-dihydrogen organopolysiloxane may be used after its chain length "n" has been appropriately adjusted in accordance with its polymerization conditions, or a commercial α,ω-dihydrogen organopolysiloxane may be used. Specifically, a catalyst described in JP 2016-098292 A may be used as the catalyst for a hydrosilylation reaction.

The polycarbonate oligomer may be produced by a reaction between a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer may be produced by a reaction between the dihydric phenol and a carbonate precursor, such as diphenyl carbonate.

A dihydric phenol represented by the following general formula (viii) is preferably used as the dihydric phenol:

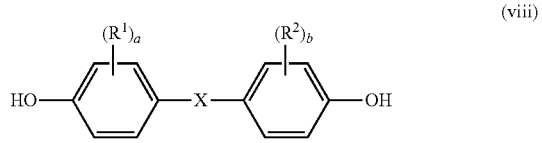

(viii)

wherein $R^1$, $R^2$, "a", "b", and X are as described above.

Examples of the dihydric phenol represented by the general formula (viii) include: bis(hydroxyphenyl)alkane-based dihydric phenols, such as 2,2-bis(4-hydroxyphenyl) propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, the PC-POS copolymer is such that in the general formula (i), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl) propane, and 2,2-bis(4-hydroxy-3,5-dibromophenyl) propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)] bisphenol, 10,10-bis(4-hydroxyphenyl)-9-anthrone, and 1,5-bis(4-hydroxyphenylthio)-2,3-dioxapentane.

In order to adjust the molecular weight of the PC-POS copolymer to be obtained, a terminal stopper (molecular weight modifier) may be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the PC-POS copolymer (A) may be obtained by appropriately leaving the resultant at rest to separate the resultant into an aqueous phase and an organic solvent phase [separating step], washing the organic solvent phase (preferably washing the phase with a basic aqueous solution, an acidic aqueous solution, and water in the stated order) [washing step], concentrating the resultant organic phase [concentrating step], and drying the concentrated phase [drying step].

In the PC-POS copolymer (A), a content of a unit represented by the following general formula (III) in the polyorganosiloxane block (A-2) is preferably 0.1 mol % or less:

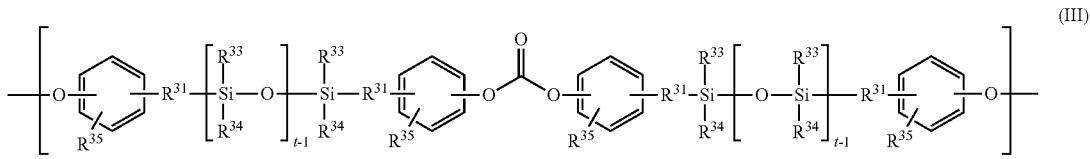

wherein $R^{33}$ and $R^{34}$ each independently represent a hydrogen atom, a halogen atom, an alkyl group having 1 to 6 carbon atoms, an alkoxy group having 1 to 6 carbon atoms, or an aryl group having 6 to 12 carbon atoms, $R^{31}$ represents an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an arylene group having 6 to 12 carbon atoms, a fluorenediyl group, an arylalkylene group having 7 to 15 carbon atoms, or an arylalkylidene group having 7 to 15 carbon atoms, $R^{35}$ represents a hydrogen atom, a halogen atom, an alkyl group having 1 to 6 carbon atoms, an alkoxy group having 1 to 6 carbon atoms, or an aryl group having 6 to 12 carbon atoms, and "t" represents an average chain length of the polyorganosiloxane.

When the content of the block represented by the general formula (III) is 0.1 mol % or less, precise control can be performed between the raw material polyorganosiloxane to be used at the time of the production of the PC-POS copolymer and the chain length of the copolymer, and hence the PC-POS copolymer (A) having both of high flexibility and transparency serving as objects can be obtained.

Specifically, the adoption of the above-mentioned interfacial polymerization method can provide a PC-POS copolymer in which the content of the block represented by the general formula (III) becomes 0.1 mol % or less. The block represented by the general formula (III) may not be theoretically incorporated into the PC-POS copolymer (A) in view of its synthesis procedure, and hence its content is substantially 0.0 mol %.

A method of quantifying the content of the block represented by the general formula (III) in the PC-POS copolymer (A) is described in detail. The content of the block represented by the general formula (III) in the PC-POS copolymer (A) is quantified by a peak of $^{13}$C-NMR. A specific quantification method is described in Examples. The quantification lower limit of the quantification method is less than 0.1 mol % on the basis of the SN ratio of the baseline of a $^{13}$C-NMR chart. Although quantification is impossible in a region of less than 0.1 mol %, semi-quantification is possible. At the time of the semi-quantification, relative comparison between the heights of peaks each corresponding to the block represented by the general formula (III) is performed. When it is difficult to perform the relative comparison between the peak heights, the lower limit at which the semi-quantification can be performed can be further lowered by further increasing the number of scans to increase the SN ratio.

The content of the block represented by the general formula (III) in the PC-POS copolymer (A) identified by the quantification method or the semi-quantification method described above is more preferably 0.08 mol % or less, still more preferably 0.05 mol % or less, particularly preferably substantially 0.0 mol %.

A conventionally known synthesis method includes causing a polymerization-active phosgene gas to react with a mixture of a bisphenol monomer and a polyorganosiloxane monomer or with a polyorganosiloxane. Accordingly, even when the amount of the block represented by the general formula (III) is reduced by improving a method of adding the phosgene gas and the time period for which the gas is brought into contact with the mixture or the polyorganosiloxane, it is impossible to set the amount of the block represented by the general formula (III) to substantially 0.0 mol % because contact between a plurality of polyorganosiloxane monomer molecules and the polymerization-active phosgene gas is inevitable.

Meanwhile, the PC-POS copolymer (A) in the polycarbonate-based resin composition of the present invention is preferably synthesized as described below. A bisphenol monomer and a phosgene gas are caused to react with each other in advance to synthesize a bisphenol monomer or bisphenol polycarbonate oligomer both the terminals of which are each a chloroformate structure. The block represented by the general formula (III) cannot be substantially produced because a polymerization-inactive polyorganosiloxane monomer is, or the polymerization-inactive polyorganosiloxane monomer and a polymerization-inactive bisphenol monomer are, caused to react with the bisphenol monomer having polymerization-active chloroformate groups at both of its terminals or the bisphenol polycarbonate oligomer having polymerization-active chloroformate groups at both of its terminals.

[Compound (B)]

The polycarbonate-based resin composition of the present invention comprises, as a component (B), at least one kind of compound selected from the group consisting of an antioxidant, a dye, a release agent, a light-diffusing agent, a flame retardant, a UV absorber, a silicone-based compound, an epoxy compound, and a polyether compound. In one embodiment of the present invention, the polycarbonate-based resin composition comprises, as the component (B), 0.001 part by mass to 0.5 part by mass of the antioxidant, 0.00001 part by mass to 0.05 part by mass of the dye, 0.001 part by mass to 0.5 part by mass of the release agent, 0.1 part by mass to 5 parts by mass of the light-diffusing agent, 0.001 part by mass to 20 parts by mass of the flame retardant, 0.01 part by mass to 1 part by mass of the UV absorber, 0.01 part by mass to 0.25 part by mass of the silicone-based compound, 0 parts by mass to 0.2 part by mass of the epoxy compound, and/or 0.2 part by mass to 1 part by mass of the polyether compound with respect to 100 parts by mass of the PC-POS copolymer (A). The compounds are described in detail below.

<Antioxidant>

The compound (B) in the polycarbonate resin composition of the present invention preferably contains an antioxidant. The incorporation of the antioxidant can prevent the oxidative deterioration of the polycarbonate-based resin composition at the time of its melting, and hence can prevent its coloring or the like due to the oxidative deterioration. For example, a phosphorus-based antioxidant and/or a phenol-based antioxidant is suitably used as the antioxidant.

1. Phosphorus-Based Antioxidant

The phosphorus-based antioxidant is preferably a phosphite-based antioxidant or a phosphine-based antioxidant from the viewpoint of obtaining a resin composition capable of suppressing the occurrence of, for example, its discoloration even when retained at high temperatures.

Examples of the phosphite-based antioxidant include tris-nonylphenyl phosphite, triphenyl phosphite, tridecyl phosphite, trioctadecyl phosphite, tris(2,4-di-tert-butylphenyl) phosphite (e.g., product name "Irgafos 168" manufactured by BASF), bis-(2,4-di-tert-butylphenyl)pentaerythritol-diphosphite (e.g., product name "Irgafos 126" manufactured by BASF and product name "ADK STAB PEP-24G" manufactured by ADEKA Corporation), bis-(2,4-di-tert-butyl-6-methylphenyl)ethyl phosphite (e.g., product name "Irgafos 38" manufactured by BASF), bis-(2,6-di-tert-butyl-4-methylphenyl)pentaerythritol-diphosphite (e.g., product name "ADK STAB PEP-36" manufactured by ADEKA Corporation), distearyl-pentaerythritol-diphosphite (e.g., product name "ADK STAB PEP-8" manufactured by ADEKA Corporation and product name "JPP-2000" manufactured by Johoku Chemical Co., Ltd.), [bis(2,4-di-tert-butyl-5-methylphenoxy)phosphino]biphenyl (e.g., product name "GSY-P101" manufactured by Osaki Industry Co., Ltd.), 2-tert-butyl-6-methyl-4-[3-(2,4,8,10-tetra-tert-butylbenzo[d][1,3,2]benzodioxaphosphepin-6-yl)oxypropyl]phenol (e.g., product name "Sumilizer GP" manufactured by Sumitomo Chemical Company, Limited), and tris[2-[[2,4,8,10-tetra-tert-butyldibenzo[d,f][1,3,2]dioxaphosphepin-6-yl]oxy] ethyl]amine (e.g., product name "Irgafos 12" manufactured by BASF).

Further, examples include compounds represented by the following formulae (12) to (15).

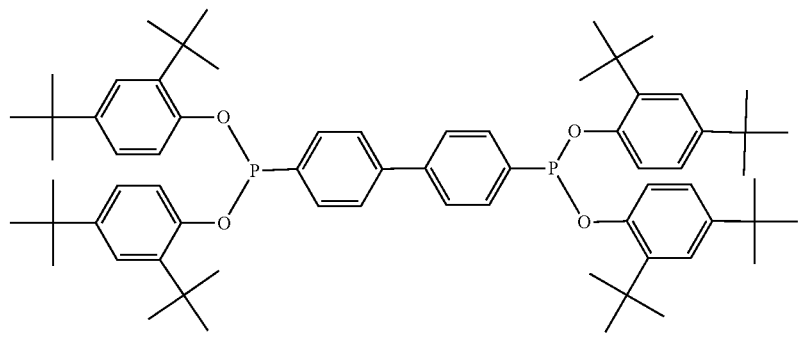

(12)

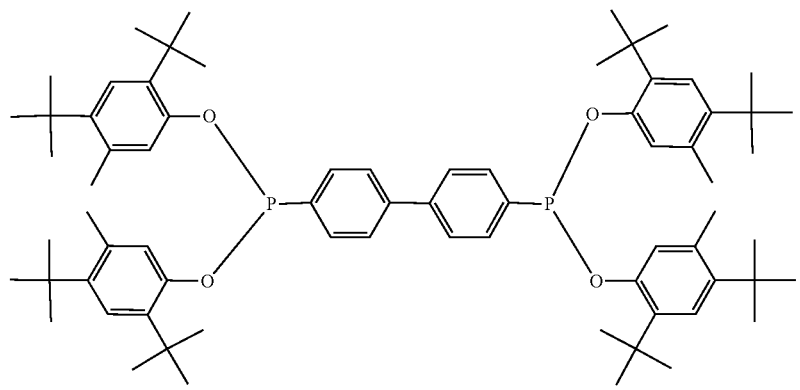

(13)

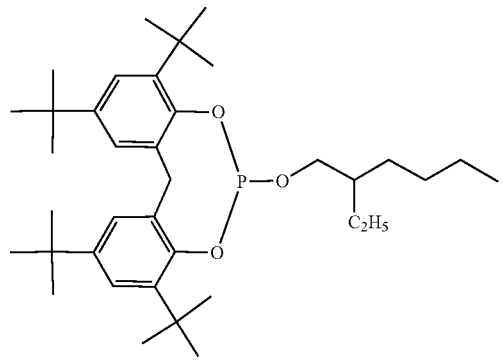

(14)

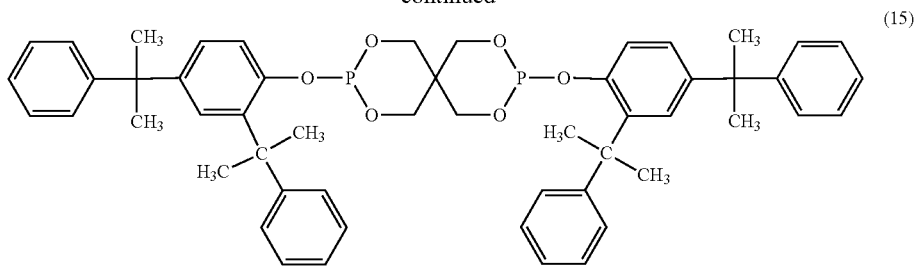

(15)

Among those phosphite-based antioxidants, from the viewpoint of the hydrolysis resistance, tris-2,4-di-tert-butylphenyl phosphite, bis(2,6-di-tert-butyl-4-methylphenyl)pentaerythritol diphosphite, bis(2,4-di-tert-butylphenyl) pentaerythritol diphosphite, and bis(2,4-dicumylphenyl) pentaerythritol diphosphite (Doverphos S-9228PC) are more preferred.

The phosphine-based antioxidant is, for example, triphenylphosphine ("JC263" manufactured by Johoku Chemical Co., Ltd.).

When the phosphorus-based antioxidant is used as the antioxidant, its content is preferably from 0.002 part by mass to 0.2 part by mass, more preferably from 0.003 part by mass to 0.1 part by mass, still more preferably from 0.003 part by mass to 0.1 part by mass with respect to 100 parts by mass of the PC-POS copolymer (A). When the content falls within the ranges, the discoloration of the resin composition, the occurrence of silver, and the like at the time of the retention of the composition at high temperatures can be sufficiently suppressed.

2. Phenol-Based Antioxidant

Examples of the phenol-based antioxidant include hindered phenols, such as n-octadecyl-3-(3,5-di-tert-butyl-4-hydroxyphenyl)propionate, 2,6-di-tert-butyl-4-methylphenol, 2,2'-methylenebis(4-methyl-6-tert-butylphenol), and pentaerythrityl-tetrakis[3-(3,5-di-tert-butyl-4-hydroxyphenyl)propionate].

Examples of the phenol-based antioxidant may include commercially available products, such as Irganox 1010 (manufactured by BASF Japan, trademark), Irganox 1076 (manufactured by BASF Japan, trademark), Irganox 1330 (manufactured by BASF Japan, trademark), Irganox 3114 (manufactured by BASF Japan, trademark), Irganox 3125 (manufactured by BASF Japan, trademark), BHT (manufactured by Takeda Pharmaceutical Company, trademark), Cyanox 1790 (manufactured by American Cyanamid Company, trademark), and Sumilizer GA-80 (manufactured by Sumitomo Chemical Co., Ltd., trademark).

The content of the antioxidant except those described in the section "1. Phosphorus-based Antioxidant" is from about 0.001 part by mass or more to about 0.5 part by mass or less, preferably from 0.01 part by mass or more to 0.3 part by mass or less, more preferably from 0.02 part by mass or more to 0.3 part by mass or less with respect to 100 parts by mass of the PC-POS copolymer (A). When the content of the antioxidant is 0.001 part by mass or more, a sufficient antioxidant effect is obtained, and when the content is 0.5 part by mass or less, the contamination of a mold to be used at the time of the molding of the polycarbonate-based resin composition can be sufficiently suppressed.

<Dye>

The compound (B) in the polycarbonate-based resin composition of the present invention may contain a dye (pigment). The dye is not particularly limited, and only needs to be a compound classified as a dye in the Colour Index (published by the Society of Dyers and Colourists). Examples thereof include red, blue, green, yellow, orange, purple, brown, and black water-soluble acid dyes, metal-containing dyes, basic dyes, cationic dyes, direct dyes, and reactive dyes, and water-insoluble dispersion dyes, sulfide dyes, and vat dyestuffs. The dye may be an organic dye or an inorganic dye. More specific examples thereof include a metal phthalocyanine pigment, a cyanine dye, an anthracene pigment, a bisazo pigment, a pyrene pigment, a polycyclic quinone pigment, a quinacridone pigment, an indigo pigment, a perylene pigment, a pyrylium dye, a squarium pigment, an anthanthrone pigment, a benzimidazole pigment, an azo pigment, a thioindigo pigment, a quinoline pigment, a lake pigment, an oxazine pigment, a dioxazine pigment, a triphenylmethane pigment, an azulenium dye, a triarylmethane dye, a xanthine dye, a thiazine dye, a thiapyrylium dye, polyvinylcarbazole, a bisbenzimidazole pigment, and an anthraquinone-based dye.

The content of the dye in the polycarbonate-based resin composition of the present invention is from about 0.00001 part by mass or more to about 0.05 part by mass or less, preferably from 0.0001 part by mass or more to 0.005 part by mass or less, more preferably from 0.0001 part by mass or more to 0.0005 part by mass or less with respect to 100 parts by mass of the PC-POS copolymer (A).

<Release Agent>

The compound (B) in the polycarbonate-based resin composition of the present invention may contain a release agent. As the release agent, for example, a fatty acid ester, a polyolefin-based wax, a fluorine oil, or a paraffin wax may be used. Among them, a fatty acid ester is preferred, and a partial ester, such as stearic acid monoglyceride, stearic acid diglyceride, stearic acid monosorbitate, behenic acid monoglyceride, pentaerythritol monostearate, pentaerythritol distearate, pentaerythritol tetrastearate, propylene glycol monostearate, or sorbitan monostearate, is more preferred.

The content of the release agent in the polycarbonate-based resin composition of the present invention is from about 0.001 part by mass or more to about 0.5 part by mass or less, preferably from 0.01 part by mass or more to 0.3 part by mass or less, more preferably from 0.03 part by mass or more to 0.3 part by mass or less with respect to 100 parts by mass of the PC-POS copolymer (A).

<Light-Diffusing Agent>

The compound (B) in the polycarbonate-based resin composition of the present invention may contain a light-diffusing agent. The light-diffusing agent is blended for imparting a light-diffusing effect to the composition, and is not particularly limited, and a known light-diffusing agent may be used. Examples thereof include a crosslinked acrylic resin, a crosslinked polystyrene resin, a silicone resin, a fluorine-based resin, silica, quartz, titanium oxide, and zinc oxide.

Among them, a Si-based light-diffusing agent is preferred because the agent can impart a flame retardancy expression-aiding effect and a light-diffusing effect to the polycarbonate-based resin composition. The Si-based light-diffusing agent is not particularly limited as long as the agent contains silicon (Si), and a known agent may be used. Examples thereof include a silicone-based elastomer and a silicone resin. Organic fine particles each formed of the silicone resin among them are preferred because the fine particles have satisfactory retention heat stability at the time of, for example, the molding of the composition, and have a flame retardancy-improving effect. The particle diameter of each of the fine particles is preferably from 0.5 μm to 10 μm, more preferably from 1 μm to 5 μm.

The content of the light-diffusing agent in the polycarbonate-based resin composition of the present invention is preferably from 0.1 part by mass to 5 parts by mass, more preferably from 0.1 part by mass to 4 parts by mass, still more preferably from 0.1 part by mass to 3 parts by mass with respect to 100 parts by mass of the PC-POS copolymer (A), though the optimum value of the content varies depending on the thickness of a molded article of the composition. When the content of the light-diffusing agent falls within the ranges, sufficient diffusion performance is obtained and the strength of the molded article can be sufficiently kept. In the case where the light-diffusing agent is added, the total light transmittance of a test piece formed of the composition entirely reduces in accordance with its addition amount. Even in this case, however, according to the present invention, a difference in transmittance caused by the thickness of the test piece is small, and hence an excellent transmittance can be maintained.

Specifically, the following diffusing agents may each be used.

Bead-shaped crosslinked silicone (manufactured by Momentive Performance Materials Japan LLC: TSR9002 (product name), average particle diameter: 2 μm)

Bead-shaped crosslinked acrylic particles (manufactured by Sekisui Kasei Co., Ltd.: MBX-5 (product name), average particle diameter: 5 μm)

Bead-shaped crosslinked acrylic particles (manufactured by Toagosei Co., Ltd.: SDP-S225 (product name), average particle diameter: 2 μm)

<Flame Retardant>

The compound (B) in the polycarbonate-based resin composition of the present invention may contain a flame retardant. Examples of the flame retardant include an organic alkaline metal salt, an organic alkaline earth metal salt, a phosphorus-based flame retardant, a silicone-based flame retardant, and expanded graphite, and the flame retardants may be used alone or in combination thereof. The flame retardant is preferably any one kind of the organic alkaline metal salt, the organic alkaline earth metal salt (hereinafter sometimes collectively referred to as "organic alkaline (earth) metal salts"), and the phosphorus-based flame retardant. Among them, the organic alkaline metal salt or the phosphorus-based flame retardant is more preferred.

Although examples of the organic alkaline (earth) metal salts include various salts, an alkaline metal salt and an organic alkaline earth metal salt of an organic acid or organic acid ester having at least one carbon atom may each be used.

Examples of the organic acid or organic acid ester include an organic sulfonic acid and an organic carboxylic acid. Examples of the alkaline metal may include lithium, sodium, potassium, and cesium. Examples of the alkaline earth metal may include magnesium, calcium, strontium, and barium. Among the alkaline metals, sodium and potassium are preferred, and potassium is particularly preferred from the viewpoints of the flame retardancy and the thermal stability. In addition, the organic acid salt thereof may be substituted with a halogen, such as fluorine, chlorine, or bromine. The alkaline (earth) metal salts may be used alone or in combination thereof.

In the case of, for example, an organic sulfonic acid, an alkaline (earth) metal salt of a perfluoroalkane sulfonic acid represented by the following formula (11) among the above-mentioned various organic alkaline (earth) metal salts is preferably used:

$$(C_eF_{2e+1}SO_3)_fM \tag{11}$$

wherein "e" represents an integer of from 1 to 10, M represents an alkaline metal, such as lithium, sodium, potassium, or cesium, or an alkaline earth metal, such as magnesium, calcium, strontium, or barium, and "f" represents the valence of M.

Compounds described in, for example, JP 47-40445 B correspond to those compounds.

Examples of the perfluoroalkane sulfonic acid represented by the formula (11) may include perfluoromethane sulfonic acid, perfluoroethane sulfonic acid, perfluoropropane sulfonic acid, perfluorobutane sulfonic acid, perfluoromethylbutane sulfonic acid, perfluorohexane sulfonic acid, perfluoroheptane sulfonic acid, and perfluorooctane sulfonic acid. Potassium salts thereof are particularly preferably used. Examples of the organic alkaline (earth) metal salts may also include alkaline metal salts of organic sulfonic acids, such as p-toluene sulfonic acid, 2,5-dichlorobenzene sulfonic acid, 2,4,5-trichlorobenzene sulfonic acid, diphenylsulfone-3-sulfonic acid, diphenylsulfone-3,3'-disulfonic acid, and naphthalene trisulfonic acid.

Examples of the organic carboxylic acid may include perfluoroformic acid, perfluoromethane carboxylic acid, perfluoroethane carboxylic acid, perfluoropropane carboxylic acid, perfluorobutane carboxylic acid, perfluoromethylbutane carboxylic acid, perfluorohexane carboxylic acid, perfluoroheptane carboxylic acid, and perfluorooctane carboxylic acid, and an alkaline metal salt of any of those organic carboxylic acids is used.

When the flame retardant is an organic alkaline (earth) metal salt, its blending amount is preferably 0.001 part by mass or more, more preferably 0.01 part by mass or more, still more preferably 0.02 part by mass or more with respect to 100 parts by mass of the PC-POS copolymer (A), and is preferably 1 part by mass or less, more preferably 0.1 part by mass or less, still more preferably 0.08 part by mass or less with respect thereto. When the blending amount falls within the ranges, more excellent flame retardancy is obtained.

Examples of the phosphorus-based flame retardant include red phosphorus and a phosphoric acid ester-based flame retardant.

The phosphoric acid ester-based flame retardant is particularly preferably a flame retardant free of a halogen, and examples thereof include flame retardants each formed of a monomer, an oligomer, or a polymer of a phosphoric acid ester, or a mixture thereof. Specific examples thereof include triphenyl phosphate, tricresyl phosphate, cresyl diphenyl phosphate, trixylenyl phosphate, tris(isopropylphenyl) phosphate, trinaphthyl phosphate, biphenol bisphosphate, bisphenol A bisphosphate, hydroquinonebisphosphate, resorcin bisphosphate, resorcinol-diphenyl phosphate, and trioxybenzene triphosphate, and substituted products and condensates thereof. The phosphorus-based flame retardants may be used alone or in combination thereof.

When the flame retardant is a phosphorus-based flame retardant, its blending amount is preferably 0.1 part by mass or more, more preferably 1 part by mass or more with respect to 100 parts by mass of the PC-POS copolymer (A), and is preferably 20 parts by mass or less, more preferably 15 parts by mass or less, still more preferably 10 parts by mass or less with respect thereto. When the blending amount is 0.1 part by mass or more, more excellent flame retardancy is obtained, and when the blending amount is 20 parts by mass or less, reductions in, for example, chemical resistance, heat resistance, tensile elongation, and impact resistance of the polycarbonate-based resin composition can be further suppressed.

<UV Absorber>

The compound (B) in the polycarbonate-based resin composition of the present invention may contain a UV absorber.

Examples of the UV absorber include a benzotriazole-based compound, a benzoxazine-based compound, a salicylate-based compound, a malonic acid ester-based compound, an oxalylanilide-based compound, a triazine-based compound, a benzophenone-based compound, and a cyanoacrylate-based compound. Those compounds may be used alone or in combination thereof.

Specific examples of the benzotriazole-based compound may include 2-(2'-hydroxy-5'-tert-octylphenyl)benzotriazole, 2-(2'-hydroxy-3',5'-di-tert-amylphenyl)benzotriazole, 2-(2'-hydroxy-5'-tert-butylphenyl)benzotriazole, 2-(2'-hydroxy-3',5'-di-tert-butylphenyl)benzotriazole, 2-[2'-hydroxy-3',5'-bis(α,α-dimethylbenzyl)phenyl]-2H-benzotriazole, 2,2'-methylene-bis[4-methyl-6-(benzotriazol-2-yl)phenol], and 2,2'-methylenebis(6-(2H-benzotriazol-2-yl)-4-(1,1,3,3-tetramethylbutyl)phenol).

Specific examples of the triazine-based compound may include 2-(4,6-diphenyl-1,3,5-triazin-2-yl)-5-(hexyloxy)phenol and 2-(4,6-bis-2,4-dimethylphenyl-1,3,5-triazin-2-yl)-5-(hexyloxy)phenol.

Specific examples of the benzophenone-based compound may include 2-hydroxy-4-n-octoxybenzophenone, 2-hydroxy-4-methoxy-benzophenone, and 2-hydroxy-4-ethoxybenzophenone.

Specific examples of the cyanoacrylate-based compound may include 2-ethyl-2-cyano-3,3-diphenyl acrylate, 2-ethylhexyl-2-cyano-3,3-diphenyl acrylate, and 1,3-bis-[2'-cyano-3,3'-diphenylacryloyloxy]-2,2-bis-[(2-cyano-3',3'-diphenylacryloyl)oxy]methylpropane.

An example of the benzoxazine-based compound may be at least one kind of compound represented by the following general formula (21):

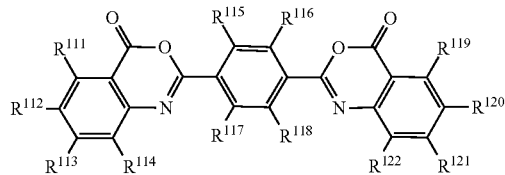

(21)

wherein $R^{111}$ to $R^{122}$ are each independently selected from the group consisting of a hydrogen atom, a hydroxyl group, a C1 to C8 alkyl group, a C1 to C8 alkoxy group, an aryl group, a carboxyl group, a sulfonic acid group, a mercaptan group, a thiol group, a cyano group, a thiocyanic acid group, an amino group, a C1 to C8 alkyl ester group, a nitro group, and a halogen atom.

The compound represented by the general formula (21) is a compound of a structure having two benzoxazinone skeletons at the para-positions of a benzene ring, and carbon at the 2-position of each of the benzoxazinone skeletons is bonded to carbon at each of the para-positions of the benzene ring. Each of the three benzene rings of the structure may have 1 to 4 substituents, or may be free of any substituent. The positions of the substituents are not limited. The kinds of the substituents may be selected independently of each other, and may be identical to or different from each other.

$R^{111}$ to $R^{122}$ in the general formula (21) are each independently selected preferably from the group consisting of a hydrogen atom, a hydroxyl group, a C1 to C8 alkyl group, a C1 to C8 alkoxy group, an aryl group, a carboxyl group, and a sulfonic acid group, more preferably from the group consisting of a hydrogen atom, a hydroxyl group, a carboxyl group, and a sulfonic acid group, still more preferably from the group consisting of a hydrogen atom and a sulfonic acid group. A compound represented by the general formula (I) in which all of $R^{111}$ to $R^{122}$ represent hydrogen atoms (2,2'-(1,4-phenylene)bis[4H-3,1-benzoxazin-4-one]) may be preferably used.

A commercially available product may be used as the compound represented by the general formula (21). Examples of the commercially available product include "Cyasorb (trademark) UV-3638F" (product name) manufactured by Cytec Industries Inc., "ELECUT ZA-101" (product name) manufactured by Takemoto Oil & Fat Co., Ltd., and "KEMISORB 500" (product name) manufactured by Chemipro Kasei Kaisha, Ltd.

Among them, at least one kind selected from the group consisting of a malonic acid ester-based compound, a benzotriazole-based compound, a triazine-based compound, and a benzoxazine-based compound is preferred.

Examples of the UV absorber may include commercially available products, such as SEESORB 709 (Shipro Kasei Kaisha, Ltd., trademark), KEMISORB 79 (Chemipro Kasei Kaisha, Ltd., trademark), KEMISORB 279 (Chemipro Kasei Kaisha, Ltd., trademark), Hostavin B-CAP (manufactured by Clariant AG, trademark), Tinuvin 234 (manufactured by BASF Japan Ltd., trademark), Tinuvin 1577 (manufactured by BASF Japan Ltd., trademark), and Cyasorb UV-3638F (manufactured by Cytec Industries Inc.).

The content of the UV absorber is from about 0.01 part by mass or more to about 1 part by mass or less, preferably from 0.05 part by mass or more to 0.7 part by mass or less, more preferably from 0.1 part by mass or more to 0.5 part by mass or less with respect to 100 parts by mass of the PC-POS copolymer. When the content of the UV absorber is 0.01 part by mass or more, sufficient light fastness is obtained, and when the content is 1 part by mass or less, the contamination of a mold to be used at the time of the molding of the polycarbonate-based resin composition can be sufficiently suppressed.

<Silicone-Based Compound>

The compound (B) in the polycarbonate-based resin composition of the present invention may contain a silicone-based compound.

The silicone-based compound has the following effects: at the time of the pelletization of the polycarbonate-based resin composition of the present invention, the compound acts like a lubricant to suppress its yellowing; and at the time of the molding thereof, the compound prevents an appearance failure, such as silver. As the silicone-based compound, there may be used a silicone-based compound having a hydrocarbon group having 1 to 12 carbon atoms, the group being bonded to a silicon atom, as represented by a compound such as a polydimethylsiloxane, a polymethylethylsiloxane, or a polymethylphenylsiloxane. In particular, a silicone-based compound having a functional group is preferably used. The silicone-based compound having a functional group is a polymer or copolymer comprising a structural unit represented by $(R^1)_a(R^2)_b SiO_{(4-a-b)/2}$ wherein $R^1$ represents a functional group, $R^2$ represents a hydrocarbon group having 1 to 12 carbon atoms, and "a" and "b" represent integers satisfying $0<a\leq 3$, $0\leq b<3$, and $0<a+b\leq 3$. Examples of the functional group represented by $R^1$ include an alkoxy group, an aryloxy group, a polyoxyalkylene group, a hydrogen group, a hydroxy group, a carboxyl group, a silanol group, an amino group, a mercapto group, an epoxy group, and a vinyl group. Among them, an alkoxy group, a hydrogen group, a hydroxy group, an epoxy group, and a vinyl group are preferred, and a methoxy group and a vinyl group are more preferred. Examples of the hydrocarbon group represented by $R^2$ include a methyl group, an ethyl group, and a phenyl group.

Among the silicone-based compounds having functional groups, a functional group-containing silicone-based compound comprising a structural unit containing a phenyl group as the hydrocarbon group represented by $R^2$ in the above-mentioned formula has particularly high usefulness. A compound containing one kind of functional group as the functional group represented by $R^1$ in the formula may be used, a compound containing a plurality of different kinds of functional groups may be used, or a mixture of the compounds may be used. A compound having a value of the ratio of the amount of the functional group ($R^1$) to the amount of the hydrocarbon group ($R^2$) in the formula of from 0.1 to 3, preferably from 0.3 to 2 is suitably used. The silicone-based compound having a functional group may be liquid or powdery. In the case of a liquid compound, its viscosity at room temperature is preferably from about 10 cSt to about 500,000 cSt. When the polycarbonate-based resin composition is used in an optical application, a difference in refractive index between the silicone-based compound and the polycarbonate resin of the composition is preferably reduced, and the refractive index of the silicone-based compound is preferably from 1.45 to 1.65, more preferably from 1.48 to 1.60.

In the polycarbonate-based resin composition of the present invention, the sodium content of the silicone-based compound is preferably 15 ppm by mass or less. When the sodium content in the silicone-based compound is 15 ppm by mass or less, at the time of the production of a molded article through use of the polycarbonate-based resin composition, an increase in yellowness of the molded article can be suppressed. The sodium content in the silicone-based compound is desirably 10 ppm by mass or less. A commercial compound may be used as the silicone-based compound. However, the sodium contents of the commercial compounds may differ from each other, and even those of products that are manufactured by the same manufacturer and have the same grade may differ from each other. Accordingly, when the silicone-based compound is used, the following is preferably performed: the sodium contents of such compounds are examined in advance, and a silicone-based compound having a low sodium content is used; or such compound is used after having been reduced in sodium content. The silicone-based compound may be colored pale yellow, and hence a silicone-based compound colored to a small extent is desirably used. As a method of reducing the amount of a metal component, such as sodium, there has been known a method including subjecting the component to adsorption treatment with, for example, aluminum hydroxide, synthetic hydrotalcite, magnesium silicate, aluminum silicate, or activated carbon.

The polycarbonate-based resin composition of the present invention may include the silicone-based compound at a content of from 0.01 part by mass to 0.25 part by mass with respect to 100 parts by mass of the PC-POS copolymer (A). When the content of the silicone-based compound falls within the range, heat stability at the time of the molding of the polycarbonate-based resin composition is excellent, and the appearance of the surface of the resultant molded article can be kept satisfactory. The content of the silicone-based compound in the polycarbonate-based resin composition is preferably from 0.03 part by mass to 0.2 part by mass, more preferably from 0.05 part by mass to 0.15 part by mass with respect to 100 parts by mass of the PC-POS copolymer (A). The content of the silicone-based compound in the polycarbonate-based resin composition may be measured by gas chromatography, and the content does not largely change from the blending amount thereof before the melt-kneading of the composition.

<Epoxy Compound>

Basically, the polycarbonate-based resin composition of the present invention preferably contains an epoxy compound when the phosphite-based antioxidant is used as the compound (B).

The phosphite-based antioxidant is more liable to hydrolyze under a moist heat environment than the polycarbonate resin is. Further, decomposition products such as phosphoric acids and phenols produced by the hydrolysis may remarkably promote the hydrolysis of the polycarbonate resin.

The inventors of the present invention have found that the epoxy compound has the following action: the compound suppresses the hydrolysis of the phosphite-based antioxidant or detoxifies a decomposition product produced by the hydrolysis of the phosphite-based antioxidant. The reduction ratio of the viscosity-average molecular weight can be adjusted to the predetermined value or less as long as the epoxy compound is used in combination even when 0.02 part by mass or more of the phosphite-based antioxidant is added to the PC-POS copolymer (A).

The epoxy compound is, for example, a compound a part of the structure of which is epoxidized.

Among the epoxy compounds, an alicyclic epoxy compound, or an epoxidized natural oil or epoxidized synthetic oil having an oxirane oxygen concentration of 4% or more is preferred from the above-mentioned viewpoint.

When a molded body formed of the resin composition is used in an application such as a container for food, the epoxidized natural oil or epoxidized synthetic oil having an oxirane oxygen concentration of 4% or more is more preferred from the viewpoint of obtaining a molded body that can safely preserve food.

Examples of the alicyclic epoxy compound include 3,4-epoxycyclohexylmethyl-3',4'-epoxycyclohexane carboxylate (e.g., a product available under the product name "CELLOXIDE 2021P" from Daicel Chemical Industries, Ltd.), a 1,2-epoxy-4-(2-oxiranyl)cyclohexane adduct of 2,2-bis(hydroxymethyl)-1-butanol (e.g., a product available under the product name "EHPE3150" from Daicel Chemical Industries, Ltd.), and a mixture of these two kinds (available under the product name "EHPE3150CE" from Daicel Chemical Industries, Ltd.).

Examples of the epoxidized natural oil having an oxirane oxygen concentration of 4% or more include SANSO CIZER E-2000H (product name, manufactured by New Japan Chemical Co., Ltd., epoxidized soybean oil, oxirane oxygen concentration: 6.7% or more) and SANSO CIZER E-9000H (product name, manufactured by New Japan Chemical Co., Ltd., epoxidized linseed oil, oxirane oxygen concentration: 8.5% or more).

Examples of the epoxidized synthetic oil having an oxirane oxygen concentration of 4% or more include SANSO CIZER E-PO (product name, manufactured by New Japan Chemical Co., Ltd., diepoxystearyl epoxyhexahydrophthalate, oxirane oxygen concentration: 5.5% or more) and SANSO CIZER E-4030 (product name, manufactured by New Japan Chemical Co., Ltd., epoxidized fatty acid butyl, oxirane oxygen concentration: 4.5% or more).

The oxirane oxygen concentration of the epoxidized natural oil or the epoxidized synthetic oil is 4% or more, preferably 5% or more, more preferably 6% or more, still more preferably 7% or more. When the oxirane oxygen concentration is less than 4%, a suppressing effect on the hydrolysis of the phosphite-based antioxidant or a detoxifying effect on a decomposition product produced by the hydrolysis is low, and as a result, the hydrolysis of the polycarbonate cannot be suppressed and it becomes difficult to adjust the reduction ratio of the molecular weight to the predetermined value or less.

The oxirane oxygen concentration means a value measured with a solution of hydrogen bromide in acetic acid on the basis of the provisions of ASTM-1652.

The content of the epoxy compound is from 0 parts by mass to 0.2 part by mass with respect to 100 parts by mass of the PC-POS copolymer (A) component. When the content falls within the range, the fluidity of the polycarbonate-based resin composition is kept satisfactory, and hence no inconvenience occurs at the time of its molding processing.

<Polyether Compound>

The polycarbonate-based resin composition of the present invention may include, as the compound (B), a polyether compound having a polyoxyalkylene structure. The polyether compound can improve an initial color tone at the time of the molding of the polycarbonate-based resin composition. The polyether compound having a polyoxyalkylene structure preferably has a polyoxyalkylene structure represented by $(R^{C1}O)_m$ and a polyoxyalkylene structure represented by $(R^{C2}O)_n$. Herein, $R^{C1}$ and $R^{C2}$ each independently represent an alkylene group having 1 or more carbon atoms, and m+n represents from 5 or more to less than 300, preferably from 10 to 200, more preferably from 20 to 100.

Examples of the alkylene group represented by any one of $R^{C1}$ and $R^{C2}$ include a methylene group, an ethylene group, a trimethylene group, a propylene group, a tetramethylene group, and a hexamethylene group. Among them, an alkylene group having 1 to 5 carbon atoms is preferred.

In the "m" $R^{C1}O$ groups, the plurality of $R^{C1}$ may represent alkylene groups identical to each other, or may represent alkylene groups different from each other in number of carbon atoms. That is, the polyoxyalkylene group represented by $(R^{C1}O)_m$ is not limited to a group having a single oxyalkylene unit as a repeating unit, such as a polyoxyethylene group or a polyoxypropylene group, and may be a group having, as repeating units, a plurality of oxyalkylene units different from each other in number of carbon atoms, such as an oxyethylene unit and an oxypropylene unit.

$R^{C2}$ is similar to $R^{C1}$, and in the "n" $R^{C2}O$ groups, the plurality of $R^{C2}$ may represent alkylene groups identical to each other, or may represent alkylene groups different from each other in number of carbon atoms.

In particular, from the viewpoint of improving the initial color tone, it is preferred that $R^{C1}$ and $R^{C2}$ each represent an alkylene group selected from an ethylene group, a propylene group, and a tetramethylene group among the above-mentioned alkylene groups represented by $R^{C1}$ and $R^{C2}$, and at least one of $R^{C1}$ or $R^{C2}$ represent one of an ethylene group and a propylene group.

In addition, the polyether compound is preferably at least one kind selected from the group consisting of a compound represented by the following general formula (IX), an alkylene oxide adduct of a polyhydric alcohol and an ester thereof, and a cyclic polyether compound:

$$R^{C3}O\text{---}(R^{C1}O)_m\text{-}A\text{-}(R^{C2}O)_n\text{---}R^{C4} \quad (IX)$$

wherein $R^{C1}$ and $R^{C2}$ each independently represent an alkylene group having 1 or more carbon atoms, m+n represents from 5 or more to less than 300, $R^{C3}$ and $R^{C4}$ each independently represent a hydrogen atom, a hydrocarbon group having 1 to carbon atoms, an alkanoyl group having 1 to 30 carbon atoms, an alkenoyl group having 2 to 30 carbon atoms, or a glycidyl group, and A represents a single bond or a divalent organic group.

The alkylene group represented by any one of $R^{C1}$ and $R^{C2}$ is as described above. In addition, the polyoxyalkylene structure represented by $(R^{C1}O)_m$ and the polyoxyalkylene structure represented by $(R^{C2}O)_n$ are also as described above.

The hydrocarbon group having 1 to 30 carbon atoms that is represented by any one of $R^{C3}$ and $R^{C4}$ is, for example, an alkyl group having 1 to 30 carbon atoms, an alkenyl group having 2 to 30 carbon atoms, an aryl group having 6 to carbon atoms, or an aralkyl group having 7 to 30 carbon atoms.

The alkyl group and the alkenyl group may be linear, branched, or cyclic, and examples thereof include a methyl group, an ethyl group, a n-propyl group, an isopropyl group, various butyl groups, various pentyl groups, various hexyl groups, various octyl groups, a cyclopentyl group, a cyclohexyl group, an allyl group, a propenyl group, various butenyl groups, various hexenyl groups, various octenyl groups, a cyclopentenyl group, and a cyclohexenyl group. Examples of the aryl group include a phenyl group, a tolyl group, and a xylyl group. Examples of the aralkyl group include a benzyl group, a phenethyl group, and a methylbenzyl group.

The alkanoyl group having 1 to 30 carbon atoms represented by any one of $R^{C3}$ and $R^{C4}$ may be linear or branched, and examples thereof include a methanoyl group, an ethanoyl group, a n-propanoyl group, an isopropanoyl group, a n-butanoyl group, a t-butanoyl group, a n-hexanoyl group, a n-octanoyl group, a n-decanoyl group, a n-dodecanoyl group, and a benzoyl group. Among them, an alkanoyl group having 1 to 20 carbon atoms is preferred from the viewpoints of the compatibility, heat stability, and ease of production of the polycarbonate-based resin composition.

The alkenoyl group having 2 to 30 carbon atoms represented by any one of $R^{C3}$ and $R^{C4}$ may be linear or branched, and examples thereof include an ethenoyl group, a n-propenoyl group, an isopropenoyl group, a n-butenoyl group, a t-butenoyl group, a n-hexenoyl group, a n-octenoyl group, a n-decenoyl group, and a n-dodecenoyl group. Among them, an alkenoyl group having 2 to 10 carbon atoms is preferred, and an alkenoyl group having 2 to 6 carbon atoms is more preferred from the viewpoint of reducing the molecular weight of the composition, from the viewpoints of the compatibility and solubility thereof, and from the viewpoint of the ease of production thereof.

An example of the divalent organic group represented by A is a group represented by the following formula (a).

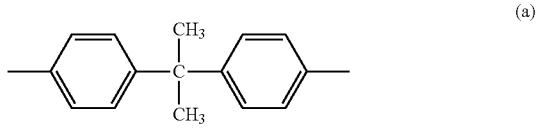

Specific examples of the polyether compound represented by the general formula (IX) include polyethylene glycol, polypropylene glycol, polytetramethylene glycol, polyoxytetramethylene polyoxyethylene glycol, polyoxyethylene polyoxypropylene glycol, polyoxyethylene monomethyl ether, polyoxyethylene dimethyl ether, polyoxyethylene-bisphenol A ether, polyoxypropylene-bisphenol A ether, polyoxyethylene-polyoxypropylene-bisphenol A ether, polyethylene glycol-allyl ether, polyethylene glycol-diallyl ether, polypropylene glycol-allyl ether, polypropylene glycol-diallyl ether, polyethylene glycol-polypropylene glycol-allyl ether, polyethylene glycol dimethacrylate, polypropylene glycol dimethacrylate, and polypropylene glycol distearate. Those compounds are available as commercially available products, and for example, "UNIOX (trademark)", "UNIOL (trademark)", "UNILUBE (trademark)", "UNISAFE (trademark)", "POLYCERIN (trademark)", and "EPIOL (trademark)" manufactured by NOF Corporation may be used.

Examples of the polyhydric alcohol in the alkylene oxide adduct of the polyhydric alcohol and the ester thereof include glycerin, diglyceryl ether, and sorbitol.

Specific examples of the cyclic polyether compound include 18-crown-6 and dibenzo-18-crown-6.

As the polyether compound, at least one kind selected from polyethylene glycol, polypropylene glycol, and polyoxyethylene glycol-polyoxypropylene glycol is preferably used.

The number-average molecular weight of the polyether compound, which is not particularly limited, is preferably from 200 to 10,000, more preferably from 500 to 8,000, still more preferably from 1,000 to 5,000.

The content of the polyether compound in the polycarbonate-based resin composition of the present invention is preferably from 0.2 part by mass to 1 part by mass, more preferably from 0.2 part by mass to 0.9 part by mass, still more preferably from 0.3 part by mass to 0.8 part by mass with respect to 100 parts by mass of the PC-POS copolymer (A). When the content of the polyether compound is 0.2 part by mass or more, the initial YI value of a molded body of the composition can be kept satisfactory. When the content of the polyether compound is 1 part by mass or less, the YI value of a molded article of the composition can be kept satisfactory at the time of its holding under high temperatures or at the time of its holding at high humidities. Accordingly, the molded article is excellent in color tone, and hence does not adversely affect the transparency of an optical molded article, such as a light-guiding plate.

The melt-kneading of the PC-POS copolymer can provide a raw material pellet. The compound (B) may be added at the time of the melt-kneading. Other additives may include a reinforcing material, a filler, an elastomer for improving impact resistance, an antistatic agent, and other resins except a polycarbonate. With regard to the addition amount of such additive, the additive may be appropriately selected and added at an appropriate ratio.

In the present invention, the polycarbonate-based resin composition is preferably free of a polycarbonate-based resin except the PC-POS copolymer (A) as a polycarbonate-based resin component. When only the polycarbonate-polyorganosiloxane copolymer (A) is used as a polycarbonate-based resin component, the composition has high flexibility and can maintain high transparency.

According to one aspect of the present invention, the content of the polyorganosiloxane block (A-2) in the polycarbonate-based resin composition is preferably from more than 40 mass % to 70 mass % or less. The content of the polyorganosiloxane block (A-2) in the resin composition is more preferably 41 mass % or more, still more preferably 45 mass % or more, for example, more than 50 mass %, and is more preferably 65 mass % or less, still more preferably 62 mass % or less.

The melt-kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. or more to 320° C. or less. An extruder, in particular a vented extruder is preferably used in the melt-kneading.

<Molded Body>

Various molded bodies may each be produced by an injection molding method, an injection compression molding method, an extrusion molding method, a blow molding method, a press molding method, a vacuum molding method, an expansion molding method, or the like using as a raw material the melt-kneaded polycarbonate-based resin composition or a pellet obtained through the melt-kneading.

The molded body of the polycarbonate-based resin composition of the present invention has a feature of having both of excellent flexibility and transparency derived from the PC-POS copolymer (A). The respective properties are described in detail. As described above, it is preferred that the polycarbonate-based resin composition of the present invention include only the PC-POS copolymer (A) as a polycarbonate-based resin component, and be free of any other polycarbonate-based resin. As described below, some of the properties of the PC-POS copolymer (A) are measured by using the copolymer turned into a molded body. However, those properties result from the very properties of the PC-POS copolymer (A), and are hence described as the properties of the PC-POS copolymer (A).

The flexibility is described in detail. The durometer hardness of the PC-POS copolymer (A) in the polycarbonate-based resin composition of the present invention measured with a type D durometer in conformity with JIS K 6253-3:2012 by a method described in Examples is preferably from 25 or more to 72 or less, more preferably from 25 or more to 60 or less.

The durometer hardness is an indicator of an indentation hardness. To obtain a molded body having high flexibility while maintaining some degree of mechanical strength, the PC-POS copolymer (A) preferably has a type D durometer hardness. The polycarbonate-based resin composition of the present invention is excellent in flexibility, and hence can, for example, be used as a lighting cover without through any packing member and correspond to a light guide having a complicated shape. Thus, the composition can drastically improve ease of construction. Further, even in the case of an optical member having, in itself, a void structure having an undercut draft angle, the member can be integrally molded out of the composition without performance of a step of cutting the inside of the member, and hence may be suitably used in a collimator lens. The molded body of the composition is excellent in transparency and flexibility, and hence may be suitably used in the following applications: home appliance-related applications, such as the substrate, light-guiding plate, and housing of a flexible display, a water- and oil-repellent film, an optical adhesive, a switch cover, a heat sealing agent, a water stop material, a sealing agent, a connector, an adapter, and a smartphone cover; optical applications, such as a lens, a part for a pair of glasses or sunglasses, and an optical fiber part; automobile-related applications, such as a cushioning material for an on-vehicle battery, a wiper blade, a convex traffic mirror at a road curve, a side mirror, a rearview mirror, a lamp cover, a bumper, a window, a glass intermediate layer, an exterior material, an interior material, a sound-absorbing material, a steering wheel cover, and a sensor cover; commodities, such as a watch part, stationery, a cosmetic container, a water tank for breeding an aquatic organism, a shoe sole, a cup, nail art, a toy, a lure, a suction cup, a cooking utensil, such as a steamer, clothes, a silicone wiping sheet, a remote controller cover, an umbrella, and a metal container lining; building material-related applications, such as a building material cover, a door, a window, a glass intermediate layer, a tent, a mirror, a show window case, and a plastic greenhouse; medical applications, such as a medical equipment casing, an infusion bag, an infusion tube, a syringe, a baby bottle, a mask, a face belt, and a filter part; and other applications, such as a damping part, a robot casing, a drone casing, a shield, a bulletproof shield, a sport cushion, a window for an aircraft, and a resin compatibilizer.

According to one aspect of the present invention, the durometer hardness of the polycarbonate-based resin composition measured with a type D durometer is more preferably 30 or more, still more preferably 40 or more, and is more preferably 55 or less, still more preferably 50 or less.

A preferred range of the durometer hardness may vary depending on an application where the molded body of the present application is used. For example, when the molded body is used in an application where emphasis is placed on flexibility, the durometer hardness is more preferably 28 or more, and is more preferably 33 or less. Alternatively, when the molded body is used in an application where emphasis is placed on both of flexibility and mechanical strength, the durometer hardness is more preferably 45 or more, and is more preferably 50 or less.

According to another aspect of the present invention, the durometer hardness of the polycarbonate-based resin composition measured with a type D durometer is more preferably 30 or more, still more preferably 40 or more, and is more preferably 70 or less, still more preferably 68 or less.

For example, when the molded body is used in an application where emphasis is placed on flexibility, the durometer hardness is more preferably 28 or more, and is more preferably 33 or less. When the molded body is used in an application where emphasis is placed on mechanical strength, the durometer hardness is more preferably 60 or more, and is more preferably 65 or less. Alternatively, when the molded body is used in an application where emphasis is placed on both of flexibility and mechanical strength, the durometer hardness is more preferably 45 or more, and is more preferably 50 or less.

The durometer hardness of the molded body cannot be measured in some cases depending on its shape. In such cases, however, the durometer hardness can be measured by: melting the molded body once; and remolding the molten product into a shape whose durometer hardness can be measured. Molding conditions in such cases are the same as those of a molding method described in Examples.

As a raw material for obtaining such molded body, there may be used a product obtained by, for example, cutting, decomposing, or breaking a molded body and a member including the molded body.

The transparency is described in detail. The total light transmittance of a 2-millimeter thick plate formed of the polycarbonate-based resin composition of the present invention measured in conformity with JIS K 7361-1:1997 is preferably 75% or more. When the total light transmittance measured under the conditions is set to 75% or more, the composition may be suitably used as any one of the above-mentioned optically transparent members because of its excellent transparency. The high transparency of the polycarbonate-based resin composition of the present invention is derived from the PC-POS copolymer (A), and hence the transparency is not impaired even when the composition includes the compound (B).

The total light transmittance of the 2-millimeter thick plate formed of the polycarbonate-based resin composition of the present invention is more preferably 85% or more, still more preferably 89% or more, still more preferably 90% or more, still more preferably 91% or more, particularly preferably 92% or more.

The molded body formed of the polycarbonate-based resin composition of the present invention may be used as an optical member or a transparent member. Specifically, the molded body may be suitably used in at least one selected from, for example, a flexible display, a light-guiding plate, a housing, a water- and oil-repellent film, an optical adhesive, a switch cover, a heat sealing agent, a water stop material, a sealing agent, a connector, an adapter, a smartphone cover, a lens, a part for a pair of glasses or sunglasses, an optical fiber part, a cushioning material for an on-vehicle battery, a wiper blade, a convex traffic mirror at a road curve, a side mirror, a rearview mirror, a lamp cover, a bumper, a window, an exterior material, an interior material, a sound-absorbing material, a steering wheel cover, a sensor cover, a watch part, stationery, a cosmetic container, a water tank for breeding an aquatic organism, a shoe sole, a cup, nail art, a toy, a lure, a suction cup, a cooking utensil, such as a steamer, clothes, a silicone wiping sheet, a remote controller cover, an umbrella, a metal container lining, a building material cover, a door, a window, a glass intermediate layer, a tent, a mirror, a show window case, a plastic greenhouse, a medical equipment casing, an infusion bag, an infusion tube, a syringe, a baby bottle, a mask, a face belt, a filter part, a damping part, a robot casing, a drone casing, a shield, a bulletproof shield, a sport cushion, a window for an aircraft, a resin compatibilizer, a lighting cover, a light guide, a light-guiding panel, a lighting unit, a prism panel, a flat-plate lens, a Fresnel lens, a microlens array, and a collimator lens.

EXAMPLES

The present invention is more specifically described by way of Examples. However, the present invention is by no means limited by these Examples. In each of Examples, characteristic values and evaluation results were determined in the following manner.

(1) Chain Length and Content of Polydimethylsiloxane

The chain length and content of a polydimethylsiloxane were calculated by NMR measurement from the integrated value ratio of a methyl group of the polydimethylsiloxane. In this description, the polydimethylsiloxane is sometimes abbreviated as PDMS.

<Quantification Method for Chain Length of Polydimethylsiloxane>

$^1$H-NMR Measurement Conditions
  NMR apparatus: ECA 500 manufactured by JEOL Resonance Co., Ltd.
  Probe: 50TH5AT/FG2
  Observed range: −5 ppm to 15 ppm
  Observation center: 5 ppm
  Pulse repetition time: 9 sec
  Pulse width: 45°
  NMR sample tube: 5φ
  Sample amount: 30 mg to 40 mg
  Solvent: deuterochloroform
  Measurement temperature: room temperature
  Number of scans: 256 times Allylphenol-Terminated Polydimethylsiloxane
  A: an integrated value of a methyl group in a dimethylsiloxane moiety observed around δ −0.02 to δ 0.5
  B: an integrated value of a methylene group in allylphenol observed around δ 2.50 to δ 2.75

Chain length of polydimethylsiloxane=(A/6)/(B/4)

Eugenol-Terminated Polydimethylsiloxane
  A: an integrated value of a methyl group in a dimethylsiloxane moiety observed around δ −0.02 to δ 0.5
  B: an integrated value of a methylene group in eugenol observed around δ 2.40 to δ 2.70

Chain length of polydimethylsiloxane=(A/6)/(B/4)

<Quantification Method for Content of Polydimethylsiloxane>

Quantification method for the copolymerization amount of a polydimethylsiloxane in a PTBP-terminated polycarbonate obtained by copolymerizing an allylphenol-terminated polydimethylsiloxane.

NMR apparatus: ECA 500 manufactured by JEOL Resonance Co., Ltd.
  Probe: 50TH5AT/FG2
  Observed range: −5 ppm to 15 ppm
  Observation center: 5 ppm
  Pulse repetition time: 9 sec
  Pulse width: 45°
  Number of scans: 256 times
  NMR sample tube: 5φ
  Sample amount: 30 mg to 40 mg
  Solvent: deuterochloroform
  Measurement temperature: room temperature A: an integrated value of a methyl group in a BPA moiety observed around δ 1.5 to δ 1.9
  B: an integrated value of a methyl group in a dimethylsiloxane moiety observed around δ −0.02 to δ 0.3
  C: an integrated value of a butyl group in a p-tert-butylphenyl moiety observed around δ 1.2 to δ 1.4

$a=A/6$ $b=B/6$ $c=C/9$ $T=a+b+c$ $f=a/T\times100$ $g=b/T\times100$ $h=c/T\times100$ $TW=f\times254+g\times74.1+h\times149$ $PDMS\ (wt\ \%)=g\times74.1/TW\times100$ <Quantification Method for Amount of Block Represented by Formula (III)>

$^{13}$C-NMR Measurement Conditions
  NMR apparatus: ECA 500 manufactured by JEOL Resonance Co., Ltd.
  Probe: C5HPD/FG probe
  Observed range: −25 ppm to 225 ppm
  Observation center: 100 ppm
  Pulse repetition time: 4 sec
  Pulse width: 45°
  NMR sample tube: 10φ
  Sample amount: 250 mg to 300 mg
  Solvent: deuterochloroform
  Measurement temperature: room temperature
  Number of scans: 10,000 times The amount of a block represented by the formula (III) is calculated from the area A of the signal peak of the carbonate bond of the block represented by the formula (III), which is detected at 150.9 ppm with respect to tetramethylsilane (TMS), and the area B of a signal peak at 152.1 ppm, which is detected as a result of the overlapping of the signals of the carbonate bond of a block represented by the formula (I-a) and a block represented by the formula (III-a), in a $^{13}$C-NMR chart measured under the above-mentioned conditions by the calculation expression "A/(A+B)" (unit: mol %).

The quantification lower limit of the quantification method was calculated to be less than 0.1 mol % on the basis of the SN ratio of the baseline of the $^{13}$C-NMR chart.

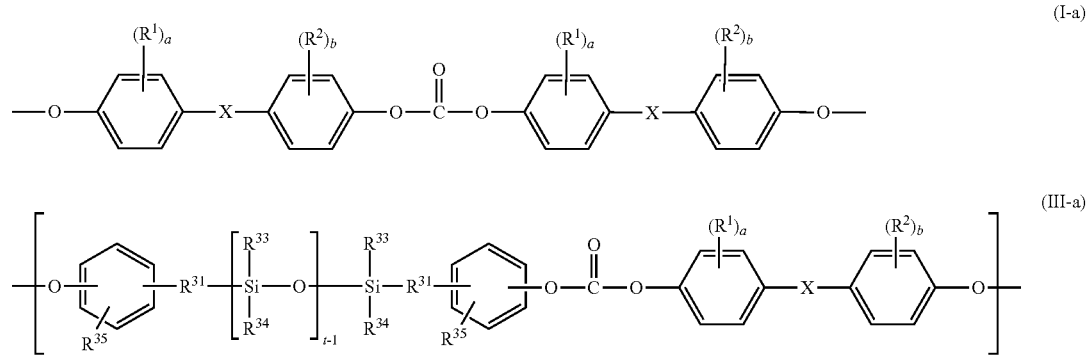

wherein $R^1$, $R^2$, $R^{31}$ to $R^{35}$, X, "a", "b", and "t" are as described above.

(2) Viscosity-Average Molecular Weight

A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta]=1.23\times10^{-5}\times Mv^{0.83}$$

(3) Weight-Average Molecular Weight and Molecular Weight Distribution

The weight-average molecular weight (Mw) and molecular weight distribution (Mw/Mn) of a PC-POS copolymer were measured with a high-speed GPC apparatus HLC-8220GPC (manufactured by Tosoh Corporation) under the following conditions, and were calculated on the basis of a general-purpose calibration curve produced through use of molecular weight standard samples.

Column temperature: 40° C.
Columns: TSK-GEL GMHXL-L, TSK-GEL G4000HXL, and TSK-GEL G2000HXL (manufactured by Tosoh Corporation)
Mobile phase solvent: Tetrahydrofuran
Flow rate: 1.0 ml/min
Detector: RI
Injection concentration: 10 mg/10 ml
Injection volume: 0.1 ml
Molecular weight standard samples: Polycarbonate 18,050 (manufactured by Idemitsu Kosan Co., Ltd., molecular weight error: ±5%/17,148 to 18,953) and polycarbonate 18,100 (manufactured by Idemitsu Kosan Co., Ltd., molecular weight error: ±5%/17,200 to 19,100)

(4) Durometer Hardness

The type A durometer hardness of a polycarbonate-based resin composition was measured with a rubber hardness meter ESA type (manufactured by Elastron, Inc.) and a constant loader EDL-1 (manufactured by Elastron, Inc.) in conformity with JIS K 6253-3:2012 Type A and ISO 7619 Type A under a load of 1 kg.

The type D durometer hardness of the polycarbonate-based resin composition was measured with a rubber hardness meter ESD type (manufactured by Elastron, Inc.) and a constant loader EDL-1 special type (with an oil damper, manufactured by Elastron, Inc.) in conformity with JIS K 6253-3:2012 Type D and ISO 7619 Type D under a load of 5 kg.

(5) Total Light Transmittance

The total light transmittance of a 2-millimeter thick plate formed of the polycarbonate-based resin composition was measured with a haze meter NDH 5000 (manufactured by Nippon Denshoku Industries Co., Ltd.) in conformity with JIS K 7361-1:1997.

<Production of Polycarbonate Oligomer>

Sodium dithionite was added in an amount of 2,000 ppm with respect to bisphenol A (BPA) (to be dissolved later) to 5.6 mass % aqueous sodium hydroxide, and then BPA was dissolved in the mixture so that the concentration of BPA was 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 341 g/L and a chloroformate group concentration of 0.71 mol/L.

Production Example 1

185 mL of the polycarbonate oligomer solution (PCO) produced as described above, 445 mL of methylene chloride, 40.4 g of an allylphenol terminal-modified polydimethylsiloxane having an average chain length "n" of 37, and 0.104 mL (0.75 mmol) of triethylamine (TEA) were loaded into a 1-liter separable flask including a baffle board and a mechanical stirrer with a stirring blade. Aqueous sodium hydroxide A (NaOHaq) (1.9 g (47 mmol) of sodium hydroxide and 22 mL of ion-exchanged water) prepared in advance was added to the mixture under stirring to perform a reaction between the polycarbonate oligomer and the allylphenol terminal-modified PDMS for 20 minutes. Next, aqueous sodium hydroxide B [BisP-AP (manufactured by Honshu Chemical Industry Co., Ltd.): 4.8 g (16 mmol), sodium hydroxide: 2.9 g (73 mmol), ion-exchanged water: 42 mL, sodium hyposulfite ($Na_2S_2O_4$): 0.006 g (0.038 mmol)] prepared in advance was further added to the resultant to advance polymerization for 20 minutes.

A solution of p-tert-butylphenol (PTBP: manufactured by DIC Corporation) in methylene chloride [solution obtained by dissolving 1.5 g (10.0 mmol) of PTBP in 10 mL of methylene chloride] and a solution C of BPA in aqueous sodium hydroxide [solution obtained by dissolving 3.0 g (10 mmol) of bisphenol A, 5.2 g (131 mmol) of NaOH, and 0.006 g (0.038 mmol) of $Na_2S_2O_4$ in 77 mL of ion-exchanged water] were added to the resultant polymerization liquid to perform a polymerization reaction for 20 minutes.

After the completion of the polymerization, the reaction liquid was transferred to a separating funnel and left at rest to be separated into an organic phase and an aqueous phase. After that, the organic layer was transferred to another separating funnel. The organic layer was sequentially washed with 100 mL of 0.03 mol/L aqueous NaOH and 100 mL of 0.2 mol/L hydrochloric acid, and was then repeatedly washed with ion-exchanged water until an electric conductivity in an aqueous phase after the washing became 10 μS/m or less.

The organic layer obtained after the washing was transferred to a vat and dried with an explosion-proof dryer (under a nitrogen atmosphere) at 48° C. overnight to provide a sheet-shaped PC-POS copolymer. The sheet-shaped PC-POS copolymer was cut to provide a flaky PC-POS copolymer (a2). Details about the PC-POS copolymer are shown in Table 1-1.

Production Example 2

A PC-POS copolymer (a10) was obtained by performing production in the same manner as in Production Example 1 except that: 43.0 g of an allylphenol terminal-modified polydimethylsiloxane having an average chain length "n" of 23 was used as an allylphenol terminal-modified polydimethylsiloxane; a solution obtained by dissolving 3.7 g (94 mmol) of NaOH in 43 mL of ion-exchanged water was used as the aqueous sodium hydroxide A; a mixture of 5.5 g (19 mmol) of BisP-AP (manufactured by Honshu Chemical Industry Co., Ltd.), 2.3 g (57 mmol) of NaOH, 33 mL of ion-exchanged water, and 0.031 g (0.196 mmol) of $Na_2S_2O_4$ was used as the aqueous sodium hydroxide B; and a solution obtained by dissolving 2.5 g (8.7 mmol) of bisphenol A, 1.9 g (46.3 mmol) of NaOH, and 0.031 g (0.196 mmol) of $Na_2S_2O_4$ in 27 mL of ion-exchanged water was used as the solution C of BPA in aqueous sodium hydroxide. Details about the PC-POS copolymer are shown in Table 1-1.

Production Example 3

A PC-POS copolymer (a14) was obtained by performing production in the same manner as in Production Example 1 except that: 46.0 g of an allylphenol terminal-modified polydimethylsiloxane having an average chain length "n" of 63 was used as an allylphenol terminal-modified polydimethylsiloxane; a solution obtained by dissolving 2.2 g (55.9 mmol) of NaOH in 26 mL of ion-exchanged water was used as the aqueous sodium hydroxide A; a mixture of 5.8 g (20 mmol) of BisP-AP (manufactured by Honshu Chemical Industry Co., Ltd.), 2.4 g (60 mmol) of NaOH, 35 mL of ion-exchanged water, and 0.031 g (0.196 mmol) of $Na_2S_2O_4$ was used as the aqueous sodium hydroxide B; and a solution obtained by dissolving 6.6 g (22.6 mmol) of bisphenol A, 3.2 g (80.9 mmol) of NaOH, and 0.031 g (0.196 mmol) of $Na_2S_2O_4$ in 47 mL of ion-exchanged water was used as the solution C of BPA in aqueous sodium hydroxide. Details about the PC-POS copolymer are shown in Table 1-1.

Production Example 4

A PC-POS copolymer (a3) was obtained by performing production in the same manner as in Production Example 1 except that: the amount of the allylphenol terminal-modified polydimethylsiloxane was set to 62.0 g; a solution obtained by dissolving 3.1 g (77 mmol) of NaOH in 35 mL of ion-exchanged water was used as the aqueous sodium hydroxide A; a solution obtained by dissolving 6.0 g (21 mmol) of BisP-AP, 2.5 g (62 mmol) of NaOH, and 0.031 g (0.20 mmol) of $Na_2S_2O_4$ in 36 mL of ion-exchanged water was used as the aqueous sodium hydroxide B; and a solution obtained by dissolving 4.0 g (14 mmol) of bisphenol A, 2.3 g (58 mmol) of NaOH, and 0.031 g (0.20 mmol) of $Na_2S_2O_4$ in 34 mL of ion-exchanged water was used as the solution C of BPA in aqueous sodium hydroxide. Details about the PC-POS copolymer are shown in Table 1-1.

Production Example 5

A PC-POS copolymer (a5) was obtained by performing production in the same manner as in Production Example 1 except that: the amount of the allylphenol terminal-modified polydimethylsiloxane was set to 96.0 g; a solution obtained by dissolving 4.0 g (100 mmol) of NaOH in 46 mL of ion-exchanged water was used as the aqueous sodium hydroxide A; a solution obtained by dissolving 7.7 g (27 mmol) of BisP-AP, 4.7 g (118 mmol) of NaOH, and 0.031 g (0.20 mmol) of $Na_2S_2O_4$ in 69 mL of ion-exchanged water was used as the aqueous sodium hydroxide B; and the solution C of BPA in aqueous sodium hydroxide was not added. Details about the PC-POS copolymer are shown in Table 1-1.

Production Example 6

A PC-POS copolymer (a9) was obtained by performing production in the same manner as in Production Example 1 except that: the amount of the allylphenol terminal-modified polydimethylsiloxane was set to 4.0 g; a solution obtained by dissolving 1.5 g (38 mmol) of NaOH in 18 mL of ion-exchanged water was used as the aqueous sodium hydroxide A; 1.8 g (12.0 mmol) of PTBP was used; a solution obtained by dissolving 13.2 g (45 mmol) of bisphenol A, 6.3 g (159 mmol) of NaOH, and 0.031 g (0.20 mmol) of $Na_2S_2O_4$ in 93 mL of ion-exchanged water was used as the solution C of BPA in aqueous sodium hydroxide; and the aqueous sodium hydroxide B was not loaded. Details about the PC-POS copolymer are shown in Table 1-2.

Production Example 7

A PC-POS copolymer (a12) was obtained by performing production in the same manner as in Production Example 1 except that: the amount of the allylphenol terminal-modified polydimethylsiloxane was set to 23.0 g; a solution obtained by dissolving 2.0 g (50.8 mmol) of NaOH in 23 mL of ion-exchanged water was used as the aqueous sodium hydroxide A; 1.8 g (12.0 mmol) of PTBP was used; a solution obtained by dissolving 11.7 g (40.4 mmol) of bisphenol A, 5.8 g (146.0 mmol) of NaOH, and 0.031 g (0.20 mmol) of $Na_2S_2O_4$ in 85 mL of ion-exchanged water was used as the solution C of BPA in aqueous sodium hydroxide; and the aqueous sodium hydroxide B was not loaded. Details about the PC-POS copolymer are shown in Table 1-2.

Production Example 8

A PC-POS copolymer (a13) was obtained by performing production in the same manner as in Production Example 1 except that: the amount of the allylphenol terminal-modified polydimethylsiloxane was set to 55 g; a solution obtained by dissolving 2.9 g (72.1 mmol) of NaOH in 33 mL of ion-exchanged water was used as the aqueous sodium hydroxide A; 1.8 g (12.0 mmol) of PTBP was used; a solution obtained by dissolving 9.3 g (32.0 mmol) of bisphenol A, 5.0 g (124.7 mmol) of NaOH, and 0.031 g (0.20 mmol) of $Na_2S_2O_4$ in 73 mL of ion-exchanged water was used as the solution C of BPA in aqueous sodium hydroxide; and the aqueous sodium hydroxide B was not loaded. Details about the PC-POS copolymer are shown in Table 1-2.

Production Example 9

A PC-POS copolymer (a7) was obtained by performing production in the same manner as in Production Example 1 except that: the amount of the allylphenol terminal-modified polydimethylsiloxane was set to 78.0 g; a solution obtained by dissolving 3.5 g (87 mmol) of NaOH in 40 mL of ion-exchanged water was used as the aqueous sodium hydroxide A; 1.8 g (12.0 mmol) of PTBP was used; a solution obtained by dissolving 7.5 g (26 mmol) of bisphenol A, 4.4 g (109 mmol) of NaOH, and 0.031 g (0.20 mmol) of $Na_2S_2O_4$ in 70 mL of ion-exchanged water was used as the solution C of BPA in aqueous sodium hydroxide; and the aqueous sodium hydroxide B was not loaded. Details about the PC-POS copolymer are shown in Table 1-2.

TABLE 1-1

|  |  | \multicolumn{5}{c}{Production Example} |
|---|---|---|---|---|---|---|
|  |  | 1 | 2 | 3 | 4 | 5 |
| Amount of PDMS in PC-POS copolymer (A) | mass % | 40 | 41 | 42 | 50 | 62 |
| Amount of BPA block*[1] in PC block (A-1) | mass % | 92.2 | 92.8 | 90.0 | 90.9 | 95.0 |
| PC block (A-1) except BPA*[2] |  | BisP-AP | BisP-AP | BisP-AP | BisP-AP | BisP-AP |
| Amount of PC block except BPA*[2] in PC-POS copolymer (A) | mass % | 5 | 4 | 5 | 5 | 2 |
| Amount of block represented by formula (III) in PC-POS copolymer (A) | mol % | <0.1 | <0.1 | <0.1 | <0.1 | <0.1 |
| PDMS chain length |  | 37 | 23 | 63 | 37 | 37 |
| Mv |  | 20,000 | 17,900 | 20,500 | 19,200 | 19,400 |
| Mw |  | 28,000 | — | — | — | 34,400 |
| Molecular weight distribution (Mw/Mn) |  | 2.5 | — | — | — | 2.8 |
| PC-POS copolymer |  | a2 | a10 | a14 | a3 | a5 |

*[1]: BPA block: The block represents a PC block derived from BPA.
*[2]: PC block except BPA: The block represents a PC block derived from a dihydric phenol except BPA.

TABLE 1-2

|  |  | \multicolumn{4}{c}{Production Example} |
|---|---|---|---|---|---|
|  |  | 6 | 7 | 8 | 9 |
| Amount of PDMS in PC-POS copolymer (A) | mass % | 6 | 25 | 45 | 55 |
| Amount of BPA block*[1] in PC block (A-1) | mass % | 100 | 100 | 100 | 100 |
| PC block (A-1) except BPA*[2] |  | — | — | — | — |
| Amount of PC block except BPA*[2] in PC-POS copolymer (A) | mass % | — | — | — | — |
| Amount of block represented by formula (III) in PC-POS copolymer (A) | mol % | <0.1 | <0.1 | <0.1 | <0.1 |
| PDMS chain length |  | 37 | 37 | 37 | 37 |
| Mv |  | 17,700 | 17,600 | 17,500 | 16,500 |
| Mw |  | — | 20,700 | 24,700 | 36,700 |
| Molecular weight distribution (Mw/Mn) |  | — | 2.3 | 2.6 | 2.9 |
| PC-POS copolymer |  | a9 | a12 | a13 | a7 |

*[1]BPA block: The block represents a PC block derived from BPA.
*[2]PC block except BPA: The block represents a PC block derived from a dihydric phenol except BPA.

Examples 1 to 49 and Comparative Examples 1 to 3

The PC-POS copolymers (A) obtained in the respective production examples and the respective compounds (B) shown in Tables 3 to 7 were melt-kneaded and pelletized to provide resin compositions. Each of the resin compositions was molded with a vacuum pressing machine (manufactured by Imoto Machinery Co., Ltd., manual hydraulic vacuum heat pressing machine). 7.0 g of the resin composition was loaded into a mold measuring 5 cm long by 5 cm wide by 2 mm thick, and surfaces in contact with the resin composition were sandwiched between mirror-finished aluminum plates. The resultant was loaded into the vacuum pressing machine, and a pressure in the vessel of the vacuum pressing machine was reduced to −0.1 MPa or less with respect to atmospheric pressure. After that, the resultant was heated until its temperature reached a molding temperature shown in each of Table 2-1 and Table 2-2 in accordance with the PC-POS copolymer (A) in each resin composition. After the temperature had reached the molding temperature, the pressing pressure was set to 2 MPa, and then the resultant was heated for 2 minutes. Subsequently, the pressing pressure was increased over 3 minutes, and the molding was performed for 5 minutes while the pressure was maintained at 15 MPa. After the molding, the pressure was returned to atmospheric pressure, and then the molded body was removed, followed by its cooling to room temperature. After that, the cooled molded body was peeled from the mirror-finished aluminum plates to provide a sample for measurement measuring 5 cm long by 5 cm wide by 2 mm thick. The evaluation results of the polycarbonate-based resin compositions are shown in Tables 3 to 7.

TABLE 2-1

|  | \multicolumn{5}{c}{PC-POS copolymer} |
|---|---|---|---|---|---|
|  | a2 | a10 | a14 | a3 | a5 |
| Molding temperature (° C.) of sample for measurement of durometer hardness | 280 | 280 | 280 | 280 | 280 |
| Durometer hardness Type D | 63 | 60 | 51 | 47 | 29 |
| Durometer hardness Type A | 95< | 95< | 95< | 95< | 78 |
| Molding temperature (° C.) of sample for measurement of total light transmittance | 180 | 230 | 230 | 180 | 180 |
| Total light transmittance (%) | 90.8 | 91.2 | 81.2 | 91.4 | 91.7 |

TABLE 2-2

|  | \multicolumn{4}{c}{PC-POS copolymer} |
|---|---|---|---|---|
|  | a12 | a13 | a7 | a9 |
| Molding temperature (° C.) of sample for measurement of durometer hardness | 280 | 280 | 280 | 280 |
| Durometer hardness Type D | 71 | 57 | 28 | 74 |
| Durometer hardness Type A | 95< | 95< | 74 | 95< |
| Molding temperature (° C.) of sample for measurement of total light transmittance | 280 | 280 | 280 | 180 |
| Total light transmittance (%) | 90.3 | 90.9 | 92.3 | 88.9 |

TABLE 3

| | | Unit | Example 1 | Example 2 | Example 3 | Example 4 | Example 5 | Example 6 | Example 7 | Example 8 | Example 9 |
|---|---|---|---|---|---|---|---|---|---|---|---|
| PC-POS copolymer (A) | a13 | Part(s) by mass | 100 | 100 | 100 | 100 | 100 | 100 | | | |
| | a7 | | | | | | | | 100 | 100 | |
| | a5 | | | | | | | | | | 100 |
| | a14 | | | | | | | | | | |
| | a10 | | | | | | | | | | |
| | a3 | | | | | | | | | | |
| | a9 | | | | | | | | | | |
| | a12 | | | | | | | | | | |
| | a2 | | | | | | | | | | |
| Compound (B) | Antioxidant Irgafos 168 | | 0.02 | 0.05 | 0.1 | 0.05 | | | 0.1 | | 0.1 |
| | Doverphos S9228PC | | | | | | | 0.05 | | 0.05 | |
| | PEP-36 | | | | | | | | 0.03 | | |
| | Inganox 1076 | | | | | | 0.02 | | | | |
| Durometer hardness Type D | | | 57 | 57 | 57 | 57 | 57 | 57 | 28 | 28 | 29 |
| Durometer hardness Type A | | | 95< | 95< | 95< | 95< | 95< | 95< | 74 | 74 | 78 |
| Total light transmittance | | % | 91 | 91 | 91 | 91 | 91 | 91 | 92 | 92 | 92 |

| | | | Example 10 | Example 11 | Example 12 | Example 13 | Example 14 | Comparative Example 1 |
|---|---|---|---|---|---|---|---|---|
| PC-POS copolymer (A) | a13 | | | | | | | |
| | a7 | | | | | | | |
| | a5 | | | | | | | |
| | a14 | | 100 | | | | | |
| | a10 | | | 100 | | | | |
| | a3 | | | | 100 | | | |
| | a9 | | | | | | | 100 |
| | a12 | | | | | 100 | | |
| | a2 | | | | | | 100 | |
| Compound (B) | Antioxidant Irgafos 168 | | 0.1 | 0.1 | 0.1 | 0.1 | 0.1 | 0.1 |
| | Doverphos S9228PC | | | | | | | |
| | PEP-36 | | | | | | | |
| | Inganox 1076 | | | | | | | |
| Durometer hardness Type D | | | 51 | 60 | 47 | 71 | 63 | 74 |
| Durometer hardness Type A | | | 95< | 95< | 95< | 95< | 95< | 95< |
| Total light transmittance | | | 81 | 91 | 91 | 90 | 91 | 89 |

TABLE 4

| | | Unit | Example 15 | Example 16 | Example 17 | Example 18 |
|---|---|---|---|---|---|---|
| PC-POS copolymer (A) | a13 | Part(s) by mass | 100 | 100 | 100 | 100 |
| | a7 | | | | | |
| | a5 | | | | | |
| | a14 | | | | | |
| | a10 | | | | | |
| | a3 | | | | | |
| | a9 | | | | | |
| | a12 | | | | | |
| | a2 | | | | | |
| Compound (B) | Antioxidant Irgafos 168 | | 0.1 | 0.1 | 0.1 | 0.1 |
| | Doverphos S9228PC | | | | | |
| | PEP-36 | | | | | |
| | Inganox 1076 | | | | | |

TABLE 4-continued

|  |  |  | Unit | Example 15 | Example 16 | Example 17 | Example 18 |
|---|---|---|---|---|---|---|---|
|  | Dye | Macrolex Blue |  | 0.00001 |  |  |  |
|  |  | Macrolex Violet |  |  | 0.0001 |  |  |
|  | Release agent | RIKEMAL S-100A |  |  |  | 0.03 |  |
|  |  | RIKESTER EW-440A |  |  |  |  | 0.1 |
| Durometer hardness Type D |  |  |  | 57 | 57 | 57 | 57 |
| Durometer hardness Type A |  |  |  | 95< | 95< | 95< | 95< |
| Total light transmittance (%) |  |  | % | 90 | 90 | 91 | 91 |

TABLE 5

|  |  |  | Unit | Example 19 | Example 20 | Example 21 | Example 22 | Example 23 | Example 24 | Example 25 | Example 26 |
|---|---|---|---|---|---|---|---|---|---|---|---|
| PC-POS copolymer (A) | a13 |  | Part(s) by mass | 100 | 100 | 100 | 100 | 100 | 100 |  |  |
|  | a7 |  |  |  |  |  |  |  |  | 100 |  |
|  | a5 |  |  |  |  |  |  |  |  |  | 100 |
|  | a14 |  |  |  |  |  |  |  |  |  |  |
|  | a10 |  |  |  |  |  |  |  |  |  |  |
|  | a3 |  |  |  |  |  |  |  |  |  |  |
|  | a9 |  |  |  |  |  |  |  |  |  |  |
|  | a12 |  |  |  |  |  |  |  |  |  |  |
|  | a2 |  |  |  |  |  |  |  |  |  |  |
| Compound (B) | Anti-oxidant | Irgafos 168 |  | 0.1 | 0.1 | 0.1 | 0.1 | 0.1 | 0.1 | 0.1 | 0.1 |
|  |  | JC263 |  |  |  |  |  |  |  |  |  |
|  | UV absorber | UV-3638F |  | 0.15 |  |  |  |  |  |  |  |
|  |  | SEESORB 709 |  |  | 0.3 |  |  |  |  | 0.3 | 0.3 |
|  |  | KEMISORB 279 |  |  |  | 0.3 |  |  |  |  |  |
|  |  | Tinuvin 234 |  |  |  |  | 0.4 |  |  |  |  |
|  |  | Tinuvin 1577 |  |  |  |  |  | 0.3 |  |  |  |
|  |  | Hostavin B-CAP |  |  |  |  |  |  | 0.3 |  |  |
|  | Silicone-based compound | KR-511 |  |  |  |  |  |  |  |  |  |
|  | Release agent | RIKEMAL S-100A |  |  |  |  |  |  |  |  |  |
| Durometer hardness Type D |  |  |  | 57 | 57 | 57 | 57 | 57 | 57 | 28 | 29 |
| Durometer hardness Type A |  |  |  | 95< | 95< | 95< | 95< | 95< | 95< | 74 | 78 |
| Total light transmittance |  |  | % | 91 | 91 | 91 | 91 | 91 | 91 | 92 | 92 |

|  |  |  | Example 27 | Example 28 | Example 29 | Example 30 | Example 31 | Example 32 | Comparative Example 2 |
|---|---|---|---|---|---|---|---|---|---|
| PC-POS copolymer (A) | a13 |  |  |  |  | 100 |  |  |  |
|  | a7 |  |  |  |  |  |  |  |  |
|  | a5 |  |  |  |  |  |  |  |  |
|  | a14 |  | 100 |  |  |  |  |  |  |
|  | a10 |  |  | 100 |  |  |  |  |  |
|  | a3 |  |  |  | 100 |  |  |  |  |
|  | a9 |  |  |  |  |  |  |  | 100 |
|  | a12 |  |  |  |  |  | 100 |  |  |
|  | a2 |  |  |  |  |  |  | 100 |  |
| Compound (B) | Anti-oxidant | Irgafos 168 | 0.1 | 0.1 | 0.1 | 0.03 | 0.1 | 0.1 | 0.1 |
|  |  | JC263 |  |  |  | 0.02 |  |  |  |
|  | UV absorber | UV-3638F |  |  |  | 0.15 |  |  |  |
|  |  | SEESORB 709 | 0.3 | 0.3 | 0.3 |  | 0.3 | 0.3 | 0.3 |
|  |  | KEMISORB 279 |  |  |  |  |  |  |  |
|  |  | Tinuvin 234 |  |  |  |  |  |  |  |
|  |  | Tinuvin 1577 |  |  |  |  |  |  |  |
|  |  | Hostavin B-CAP |  |  |  |  |  |  |  |

TABLE 5-continued

|  |  | | | | | | | |
|---|---|---|---|---|---|---|---|---|
| Silicone-based compound | KR-511 |  |  |  |  | 0.1 |  |  |
| Release agent | RIKEMAL S-100A |  |  |  |  | 0.03 |  |  |
| Durometer hardness Type D |  | 51 | 60 | 47 | 57 | 71 | 63 | 74 |
| Durometer hardness Type A |  | 95< | 95< | 95< | 95< | 95< | 95< | 95< |
| Total light transmittance |  | 81 | 91 | 91 | 91 | 90 | 91 | 89 |

TABLE 6

|  |  |  | Unit | Example | | | | | | | |
|---|---|---|---|---|---|---|---|---|---|---|---|
|  |  |  |  | 33 | 34 | 35 | 36 | 37 | 38 | 39 | 40 |
| PC-POS copolymer (A) |  | a13 | Part(s) by mass |  |  |  |  |  | 100 | 100 | 100 |
|  |  | a7 |  | 100 |  |  |  |  |  |  |  |
|  |  | a5 |  |  | 100 |  |  |  |  |  |  |
|  |  | a14 |  |  |  | 100 |  |  |  |  |  |
|  |  | a10 |  |  |  |  | 100 |  |  |  |  |
|  |  | a3 |  |  |  |  |  | 100 |  |  |  |
|  |  | a9 |  |  |  |  |  |  |  |  |  |
|  |  | a12 |  |  |  |  |  |  |  |  |  |
|  |  | a2 |  |  |  |  |  |  |  |  |  |
| Compound (B) | Anti-oxidant | Irgafos 168 |  |  |  |  |  |  | 0.03 |  |  |
|  |  | Doverphos S9228PC |  | 0.05 | 0.05 | 0.05 | 0.05 | 0.05 |  | 0.02 | 0.1 |
|  |  | Inganox 1076 |  |  |  |  |  |  |  | 0.07 |  |
|  | Epoxy compound | CELLOXIDE 2021P |  | 0.02 | 0.02 | 0.02 | 0.02 | 0.02 | 0.01 | 0.1 | 0.02 |
|  | Silicone-based compound | KR-511 |  |  |  |  |  |  | 0.1 |  |  |
|  | Polyether | UNILUBE 50DE-25R |  |  |  |  |  |  |  |  | 0.8 |
|  | Release agent | RIKEMAL S-100A |  |  |  |  |  |  | 0.03 | 0.03 | 0.03 |
| Durometer hardness Type D |  |  |  | 28 | 29 | 51 | 60 | 47 | 57 | 57 | 56 |
| Durometer hardness Type A |  |  |  | 74 | 78 | 95< | 95< | 95< | 95< | 95< | 95< |
| Total light transmittance (%) |  |  | % | 92 | 92 | 81 | 91 | 91 | 91 | 91 | 92 |

|  |  |  | Example | | | Comparative Example | Example | |
|---|---|---|---|---|---|---|---|---|
|  |  |  | 41 | 42 | 43 | 3 | 44 | 45 |
| PC-POS copolymer (A) |  | a13 | 100 |  |  |  | 100 | 100 |
|  |  | a7 |  |  |  |  |  |  |
|  |  | a5 |  |  |  |  |  |  |
|  |  | a14 |  |  |  |  |  |  |
|  |  | a10 |  |  |  |  |  |  |
|  |  | a3 |  |  |  |  |  |  |
|  |  | a9 |  |  |  | 100 |  |  |
|  |  | a12 |  | 100 |  |  |  |  |
|  |  | a2 |  |  | 100 |  |  |  |
| Compound (B) | Anti-oxidant | Irgafos 168 |  |  |  |  | 0.03 |  |
|  |  | Doverphos S9228PC | 0.1 | 0.05 | 0.05 | 0.05 |  | 0.05 |
|  |  | Inganox 1076 |  |  |  |  |  |  |
|  | Epoxy compound | CELLOXIDE 2021P | 0.02 | 0.02 | 0.02 | 0.02 |  |  |
|  | Silicone-based compound | KR-511 | 0.05 |  |  |  | 0.05 | 0.05 |
|  | Polyether | UNILUBE 50DE-25R | 0.8 |  |  |  |  |  |
|  | Release agent | RIKEMAL S-100A |  |  |  |  |  |  |

TABLE 6-continued

|  |  |  |  |  |  |  |
|---|---|---|---|---|---|---|
| Durometer hardness Type D | 56 | 71 | 63 | 74 | 57 | 57 |
| Durometer hardness Type A | 95< | 95< | 95< | 95< | 95< | 95< |
| Total light transmittance (%) | 92 | 90 | 91 | 89 | 91 | 91 |

TABLE 7

|  |  |  | Example | | | |
|---|---|---|---|---|---|---|
|  |  | Unit | 46 | 47 | 48 | 49 |
| PC-POS copolymer (A) | a13 a7 a5 a14 a10 a3 a9 a12 a2 | Part(s) by mass | 100 | 100 | 100 | 100 |
| Compound (B) | Antioxidant Irgafos 168 | | 0.1 | 0.1 | 0.1 | 0.1 |
|  | Light-diffusing agent TSR9002 | | | 0.4 | 2 | |
|  | MBX-5 | | | | | 0.4 |
|  | Flame retardant KFBS | | 0.08 | | | |
| Durometer hardness Type D | | | 57 | 57 | 57 | 57 |
| Durometer hardness Type A | | | 95< | 95< | 95< | 95< |
| Total light transmittance | | % | 89 | 60 | 48 | 80 |

Compound (B)
<Antioxidant>
  Irgafos 168: tris(2,4-di-tefrtbutylphenyl)phosphite; manufactured by BASF Japan Ltd.
  Doverphos S9228PC: bis(2,4-dicumylphenyl)pentaerythritol diphosphite, Na content: 50 mass % or less; manufactured by Dover Chemical Co.
  PEP-36: bis-(2,6-di-tert-butyl-4-methylphenyl)pentaerythritol-diphosphite; manufactured by ADEKA Corporation
  Irganox 1076: n-octadecyl-3-(3,5-di-tert-butyl-4-hydroxyphenyl)propionate; manufactured by ADEKA Corporation
  JC263: triphenylphosphine; manufactured by Johoku Chemical Co., Ltd.
<Dye>
  MACROLEX Blue RR; manufactured by LANXESS
  MACROLEX Violet B; manufactured by LANXESS
<Release Agent>
  RIKEMAL 5-100A: stearic acid monoglyceride; manufactured by Riken Vitamin Co., Ltd.
  RIKESTER EW-440A: pentaerythritol tetrastearate, manufactured by Riken Vitamin Co., Ltd.
<UV Absorber>
  Cyasorb UV-3638F: (2,2'-(1,4-phenylene)bis[4H-3,1-benzoxazin-4-one]; manufactured by Cytec Industries Inc.
  SEESORB 709: 2-(2'-hydroxy-5'-tert-octylphenyl)benzotriazole; manufactured by Shipro Kasei Kaisha, Ltd.
  KEMISORB 279: 2,2'-methylenebis(6-(2H-benzotriazol-2-yl)-4-(1,1,3,3-tetramethylbutyl)phenol); manufactured by Chemipro Kasei Kaisha, Ltd.
  Tinuvin 234: 2-[2'-hydroxy-3',5'-bis(α,α-dimethylbenzyl)phenyl]-2H-benzotriazole; manufactured by BASF Japan Ltd.
  Tinuvin 1577: 2-(4,6-diphenyl-1,3,5-triazin-2-yl)-5-(hexyloxy)phenol; manufactured by BASF Japan Ltd.
  Hostavin B-CAP: p-phenylenebis(methylenemalonic acid) tetraethyl ester; manufactured by Clariant Chemicals K.K.
<Flame Retardant>
  KFBS: potassium perfluorobutanesulfonate; manufactured by Mitsubishi Materials Electronic Chemicals Co., Ltd.
<Polyether Compound>
  UNILUBE 50DE-25R: polyoxyethylene-polyoxypropylene-bisphenol A ether; manufactured by NOF Corporation
<Silicone-Based Compound>
  KR-511: reactive silicone compound; manufactured by Shin-Etsu Chemical Co., Ltd., containing a phenyl group, a methoxy group, and a vinyl group, refractive index=1.518
<Epoxy Compound>
  CELLOXIDE 2021P: 3,4-epoxycyclohexylmethyl-3',4'-epoxycyclohexanecarboxylate
<Light-Diffusing Agent>
  TSR9002 (product name): bead-shaped crosslinked silicone, average particle diameter: 2 μm; manufactured by Momentive Performance Materials Japan LLC
  MBX-5 (product name): bead-shaped crosslinked acrylic particles, average particle diameter: 5 μm; manufactured by Sekisui Kasei Co., Ltd.

INDUSTRIAL APPLICABILITY

According to the present invention, the polycarbonate-based resin composition having both of excellent flexibility and transparency can be provided. The molded body formed of the polycarbonate-based resin composition of the present invention may be used as an optically transparent member. Specifically, the molded body may be suitably used in at least one selected from, for example, a flexible display, a light-guiding plate, a housing, a water- and oil-repellent film, an optical adhesive, a switch cover, a heat sealing agent, a water stop material, a sealing agent, a connector, an adapter, a smartphone cover, a lens, a part for a pair of glasses or sunglasses, an optical fiber part, a cushioning material for an on-vehicle battery, a wiper blade, a convex traffic mirror at a road curve, a side mirror, a rearview mirror, a lamp cover, a bumper, a window, an exterior material, an interior material, a sound-absorbing material, a steering wheel cover, a sensor cover, a watch part, stationery, a cosmetic container, a water tank for breeding an aquatic organism, a shoe sole, a cup, nail art, a toy, a lure, a suction cup, a cooking utensil, such as a steamer, clothes, a silicone wiping sheet, a remote controller cover, an umbrella, a metal container lining, a building material cover, a door, a window, a glass intermediate layer, a tent, a mirror, a show window case, a plastic greenhouse, a medical equipment casing, an infusion bag, an infusion tube, a syringe, a baby bottle, a mask, a face belt, a filter part, a damping part, a robot casing, a drone casing, a shield, a bulletproof shield, a sport cushion, a window for an aircraft, a resin compatibilizer, a lighting cover, a light guide, a light-guiding panel, a lighting unit, a prism panel, a flat-plate lens, a Fresnel lens, a microlens array, and a collimator lens.

The invention claimed is:
1. A polycarbonate-based resin composition, comprising:
a polycarbonate-polyorganosiloxane copolymer (A); and
at least one kind of compound (B) selected from the group consisting of an antioxidant, a release agent, a flame retardant, a UV absorber, a silicone-based compound, an epoxy compound, and a polyether compound,
wherein the polycarbonate-polyorganosiloxane copolymer (A) consists of a polycarbonate block (A-1) comprising a repeating unit represented by the following general formula (I) and a polyorganosiloxane block (A-2) containing a repeating unit represented by the following general formula (II),
wherein the polycarbonate-based resin composition does not comprise a dye;
wherein the polycarbonate-based resin composition does not comprise a light-diffusing agent; and
wherein the following requirements (1) to (3) are satisfied:
(1) a content of the polyorganosiloxane block (A-2) in the polycarbonate-based resin composition is from 40 mass % or more to 70 mass % or less;
(2) the polycarbonate-polyorganosiloxane copolymer (A) has a viscosity-average molecular weight of from 10,000 or more to 23,000 or less; and
(3) a bisphenol A (BPA) block represented by the following formula (I-i) constitutes 90 mass % or more of the polycarbonate block (A-1),

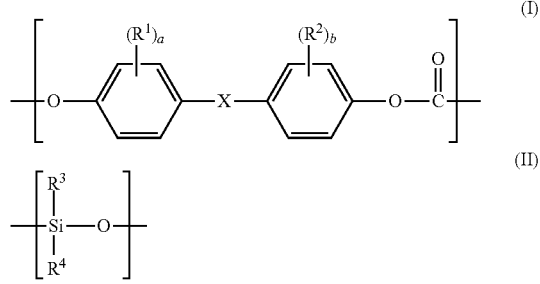

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, an arylene group having 6 to 12 carbon atoms, a cycloalkylidene group having 5 to 15 carbon atoms, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and "a" and "b" each independently represent an integer of from 0 to 4,

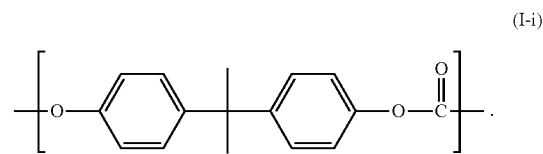

2. The polycarbonate-based resin composition according to claim 1, wherein the polycarbonate-based resin composition comprises 0.001 part by mass to 0.5 part by mass of the antioxidant, 0.001 part by mass to 0.5 part by mass of the release agent, 0.001 part by mass to 20 parts by mass of the flame retardant, 0.01 part by mass to 1 part by mass of the UV absorber, 0.01 part by mass to 0.25 part by mass of the silicone-based compound, 0 parts by mass to 0.2 part by mass of the epoxy compound, and/or 0.2 part by mass to 1 part by mass of the polyether compound with respect to 100 parts by mass of the polycarbonate-polyorganosiloxane copolymer (A).

3. The polycarbonate-based resin composition according to claim 1, wherein a content of a unit represented by the following general formula (III) in the polyorganosiloxane block (A-2) is 0.1 mol % or less:

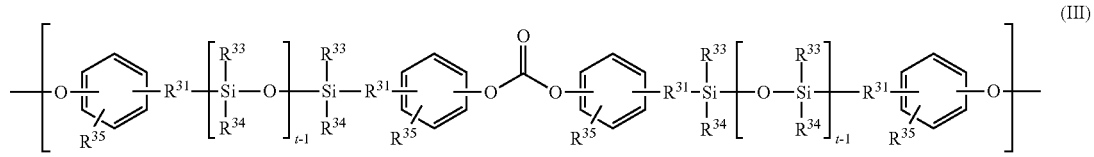

wherein $R^{33}$ and $R^{34}$ each independently represent a hydrogen atom, a halogen atom, an alkyl group having 1 to 6 carbon atoms, an alkoxy group having 1 to 6 carbon atoms, or an aryl group having 6 to 12 carbon atoms, $R^{31}$ represents an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, an arylene group having 6 to 12 carbon atoms, a fluorenediyl group, an arylalkylene group having 7 to 15 carbon atoms, or an arylalkylidene group having 7 to 15 carbon atoms, $R^{35}$ represents a hydrogen atom, a halogen atom, an alkyl group having 1 to 6 carbon atoms, an alkoxy group having 1 to 6 carbon atoms, or an aryl group having 6 to 12 carbon atoms, and "t" represents an average chain length of the polyorganosiloxane.

4. The polycarbonate-based resin composition according to claim 1, wherein the polyorganosiloxane block (A-2) has a number of repetitions of from 10 or more to less than 90.

5. The polycarbonate-based resin composition according to claim 4, wherein the polyorganosiloxane block (A-2) has a number of repetitions of from 10 or more to 40 or less.

6. The polycarbonate-based resin composition according to claim 1, wherein the polycarbonate-polyorganosiloxane copolymer (A) has a molecular weight distribution Mw/Mn of from 2.1 or more to 3.9 or less.

7. The polycarbonate-based resin composition according to claim 1, wherein the polycarbonate-polyorganosiloxane copolymer (A) has a weight-average molecular weight of 40,000 or less.

8. The polycarbonate-based resin composition according to claim 1, wherein the polyorganosiloxane block (A-2) contains a unit represented by at least one of the following general formulae (II-I) to (II-III):

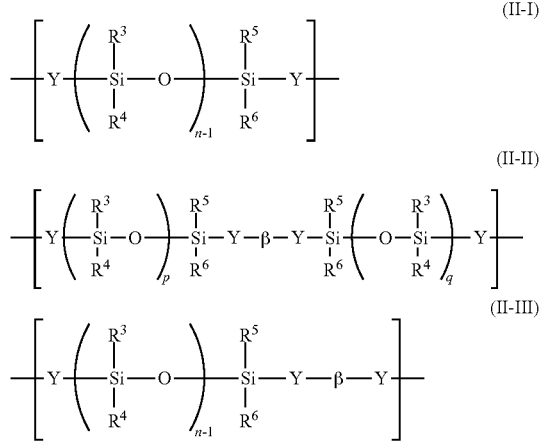

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, Y represents —$R^7$O—, —$R^7$COO—, —$R^7$NH—, —$R^7NR^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, "n" represents a chain length of the polyorganosiloxane, n-1, and "p" and "q" each represent an integer of 1 or more representing the number of repetitions of a polyorganosiloxane unit, and a sum of "p" and "q" is n-2.

9. The polycarbonate-based resin composition according to claim 1, wherein the polyorganosiloxane block (A-2) contains a unit represented by the following general formula (V):

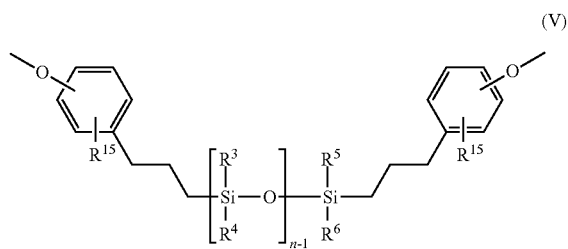

wherein each of $R^3$ to $R^6$ independently represents a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$, or $R^6$ may be identical to or different from each other, "n" represents a chain length of the polyorganosiloxane, and n-1 represents an integer of 1 or more representing the number of repetitions of a polyorganosiloxane unit, and $R^{15}$ represents a hydrogen atom, a halogen atom, an alkyl group having 1 to 6 carbon atoms, an alkoxy group having 1 to 6 carbon atoms, or an aryl group having 6 to 12 carbon atoms.

10. The polycarbonate-based resin composition according to claim 1, wherein a 2-millimeter thick plate formed of the polycarbonate-based resin composition has a total light transmittance of 75% or more, which is measured in conformity with JIS K 7361-1:1997.

11. The polycarbonate-based resin composition according to claim 1, wherein the polycarbonate-based resin composition has a durometer hardness of from 25 or more to 72 or less, which is measured with a type D durometer in conformity with JIS K 6253-3:2012.

12. The polycarbonate-based resin composition according to claim 1, wherein the polycarbonate-based resin composition has a durometer hardness of from 25 or more to 60 or less, which is measured with a type D durometer in conformity with JIS K 6253-3:2012.

13. The polycarbonate-based resin composition according to claim 1, wherein the polycarbonate-based resin composition is free of a polycarbonate-based resin except the polycarbonate-polyorganosiloxane copolymer (A).

* * * * *